US009857558B1

(12) United States Patent
Bone et al.

(10) Patent No.: US 9,857,558 B1
(45) Date of Patent: Jan. 2, 2018

(54) OPTICAL IMAGING LENS

(71) Applicant: GENIUS ELECTRONIC OPTICAL CO., LTD., Taichung (TW)

(72) Inventors: Matthew Bone, Xiamen (CN); Yan Bin Chen, Xiamen (CN); Bai Na Chen, Xiamen (CN); Feng Chen, Xiamen (CN)

(73) Assignee: GeniuS Electronic Optical (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 15/213,185

(22) Filed: Jul. 18, 2016

(30) Foreign Application Priority Data

Jul. 5, 2016 (CN) .......................... 2016 1 0523509

(51) Int. Cl.

| | |
|---|---|
| ***G02B 9/34*** | (2006.01) |
| ***G02B 9/58*** | (2006.01) |
| ***G02B 13/00*** | (2006.01) |
| ***G02B 27/00*** | (2006.01) |

(52) U.S. Cl.
CPC ................. *G02B 9/34* (2013.01); *G02B 9/58* (2013.01); *G02B 13/004* (2013.01); *G02B 27/0025* (2013.01)

(58) Field of Classification Search
CPC ........... G02B 9/34; G02B 9/58; G02B 13/004
USPC ........ 359/715, 734, 747, 771, 772, 779–783
See application file for complete search history.

(56) References Cited

U.S. PATENT DOCUMENTS

| | | | | |
|---|---|---|---|---|
| 6,043,941 A * | 3/2000 | Yamada | G02B 9/58 359/753 |
| 9,354,425 B2 | 5/2016 | Lin et al. | |
| 2014/0098432 A1* | 4/2014 | Kubota | G02B 13/004 359/781 |
| 2015/0177486 A1* | 6/2015 | Ahn | G02B 9/34 348/335 |

FOREIGN PATENT DOCUMENTS

| | | |
|---|---|---|
| CN | 201917707 | 8/2011 |
| CN | 102566013 | 6/2014 |
| TW | I426316 | 2/2014 |

* cited by examiner

*Primary Examiner* — Darryl J Collins
(74) *Attorney, Agent, or Firm* — Baker & McKenzie LLP

(57) ABSTRACT

Present embodiments provide for an optical imaging lens. The optical imaging lens comprises a first lens element, a second lens element, a third lens element and a fourth lens element positioned in an order from an object side to an image side. Through controlling the convex or concave shape of the surfaces of the lens elements and designing parameters satisfying at least one inequality, the optical imaging lens shows better optical characteristics and enlarge field angle while the total length of the optical imaging lens is shortened.

19 Claims, 43 Drawing Sheets

| EFL (Effective focus length) = 1.832 mm, HFOV (Half angular field of view) = 73.043deg. TTL (System length) = 13.303 mm, Image height= 2.124 mm, Fno = 2.745 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 111 | 1st lens element | 70.000 | 4.708 | 1.545 | 55.987 | -3.893 | plastic |
| 112 | | 1.982 | 2.695 | | | | |
| 121 | 2nd lens element | -11.179 | 1.261 | 1.545 | 55.987 | 5.233 | plastic |
| 122 | | -2.334 | 0.247 | | | | |
| 100 | Aperture stop | ∞ | 0.682 | | | | |
| 131 | 3rd lens element | 5.522 | 0.646 | 1.517 | 64.198 | 3.354 | glass |
| 132 | | -2.379 | 1.705 | | | | |
| 141 | 4th lens element | -9.795 | 0.396 | 1.661 | 20.401 | -4.904 | plastic |
| 142 | | 4.670 | 0.293 | | | | |
| 151 | Cover glass | ∞ | 0.300 | | | | glass |
| 152 | | ∞ | 0.370 | | | | |
| 160 | Image plane | ∞ | 0.000 | | | | |

FIG. 8

| Aspherical parameters | | | | |
|---|---|---|---|---|
| Surface# | 111 | 112 | 121 | 122 |
| K | | 0.000E+00 | 0.000E+00 | 0.000E+00 |
| $a_2$ | | 0.000E+00 | 0.000E+00 | 0.000E+00 |
| $a_4$ | | -3.899E-03 | -4.371E-02 | 6.662E-03 |
| $a_6$ | | 2.467E-04 | 3.435E-03 | 9.154E-03 |
| $a_8$ | | -3.742E-04 | 5.253E-05 | -7.045E-03 |
| $a_{10}$ | | 0.000E+00 | 0.000E+00 | 1.029E-03 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 131 | 132 | 141 | 142 |
| K | | | 0.000E+00 | 0.000E+00 |
| $a_2$ | | | 0.000E+00 | 0.000E+00 |
| $a_4$ | | | -1.560E-01 | -1.151E-01 |
| $a_6$ | | | 1.624E-02 | 2.700E-02 |
| $a_8$ | | | -6.035E-03 | -6.276E-03 |
| $a_{10}$ | | | 0.000E+00 | 5.771E-04 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 9

| EFL (Effective focus length) = 1.859 mm, HFOV (Half angular field of view) = 73.043 deg., TTL (System length) = 9.02 mm, Image height= 2.109 mm, Fno = 2.742 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 211 | 1st lens element | 70.000 | 0.260 | 1.545 | 55.987 | -3.595 | plastic |
| 212 | | 1.876 | 2.142 | | | | |
| 221 | 2nd lens element | -8.422 | 1.633 | 1.545 | 55.987 | 5.549 | plastic |
| 222 | | -2.350 | 0.162 | | | | |
| 200 | Aperture stop | ∞ | 0.098 | | | | |
| 231 | 3rd lens element | 5.801 | 1.611 | 1.517 | 64.198 | 3.485 | glass |
| 232 | | -2.321 | 1.768 | | | | |
| 241 | 4th lens element | -16.161 | 0.372 | 1.661 | 20.401 | -5.582 | plastic |
| 242 | | 4.610 | 0.304 | | | | |
| 251 | Cover glass | ∞ | 0.300 | | | | glass |
| 252 | | ∞ | 0.370 | | | | |
| 260 | Image plane | ∞ | 0.000 | | | | |

FIG. 12

| Aspherical parameters | | | | |
|---|---|---|---|---|
| Surface# | 211 | 212 | 221 | 222 |
| K | | 0.000E+00 | 0.000E+00 | 0.000E+00 |
| $a_2$ | | 0.000E+00 | 0.000E+00 | 0.000E+00 |
| $a_4$ | | -7.436E-03 | -4.107E-02 | 8.993E-03 |
| $a_6$ | | 1.971E-04 | 1.956E-03 | 5.277E-03 |
| $a_8$ | | -6.214E-04 | 5.409E-04 | 2.360E-03 |
| $a_{10}$ | | 0.000E+00 | 0.000E+00 | -5.340E-03 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 231 | 232 | 241 | 242 |
| K | | | 0.000E+00 | 0.000E+00 |
| $a_2$ | | | 0.000E+00 | 0.000E+00 |
| $a_4$ | | | -1.570E-01 | -1.147E-01 |
| $a_6$ | | | 2.014E-02 | 2.672E-02 |
| $a_8$ | | | -6.687E-03 | -6.210E-03 |
| $a_{10}$ | | | 0.000E+00 | 5.367E-04 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 13

| EFL (Effective focus length) = 1.867 mm, HFOV (Half angular field of view) = 73.043 deg., TTL (System length) = 9.754 mm, Image height= 2.109 mm, Fno = 2.756 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 311 | 1st lens element | 70.000 | 1.657 | 1.545 | 55.987 | -3.354 | plastic |
| 312 | | 1.741 | 1.810 | | | | |
| 321 | 2nd lens element | -6.627 | 1.391 | 1.545 | 55.987 | 5.151 | plastic |
| 322 | | -2.094 | 0.491 | | | | |
| 300 | Aperture stop | ∞ | 0.100 | | | | |
| 331 | 3rd lens element | 4.120 | 1.389 | 1.517 | 64.198 | 3.343 | glass |
| 332 | | -2.575 | 1.682 | | | | |
| 341 | 4th lens element | -61.595 | 0.268 | 1.661 | 20.401 | -5.768 | plastic |
| 342 | | 3.921 | 0.297 | | | | |
| 351 | Cover glass | ∞ | 0.300 | | | | glass |
| 352 | | ∞ | 0.370 | | | | |
| 360 | Image plane | ∞ | 0.000 | | | | |

FIG. 16

| Aspherical parameters | | | | |
|---|---|---|---|---|
| Surface# | 311 | 312 | 321 | 322 |
| K | | 0.000E+00 | 0.000E+00 | 0.000E+00 |
| $a_2$ | | 0.000E+00 | 0.000E+00 | 0.000E+00 |
| $a_4$ | | -1.173E-02 | -5.652E-02 | -6.915E-04 |
| $a_6$ | | 5.849E-04 | 2.637E-03 | 9.164E-03 |
| $a_8$ | | -9.130E-04 | -1.434E-03 | -6.926E-03 |
| $a_{10}$ | | 0.000E+00 | 0.000E+00 | 2.312E-03 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 331 | 332 | 341 | 342 |
| K | | | 0.000E+00 | 0.000E+00 |
| $a_2$ | | | 0.000E+00 | 0.000E+00 |
| $a_4$ | | | -2.532E-01 | -1.890E-01 |
| $a_6$ | | | 3.261E-02 | 4.189E-02 |
| $a_8$ | | | -2.158E-02 | -1.265E-02 |
| $a_{10}$ | | | 0.000E+00 | 1.405E-03 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 17

| EFL（Effective focus length）= 1.865 mm, HFOV（Half angular field of view) = 73.030 deg., TTL（System length）= 10.895 mm, Image height= 2.109 mm, Fno = 2.734 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 411 | 1st lens element | 70.000 | 1.523 | 1.545 | 55.987 | -3.980 | plastic |
| 412 | | 2.058 | 2.361 | | | | |
| 421 | 2nd lens element | -7.061 | 1.730 | 1.545 | 55.987 | 6.004 | plastic |
| 422 | | -2.403 | 0.417 | | | | |
| 400 | Aperture stop | ∞ | 0.099 | | | | |
| 431 | 3rd lens element | 2.763 | 2.303 | 1.517 | 64.198 | 3.143 | glass |
| 432 | | -2.741 | 0.930 | | | | |
| 441 | 4th lens element | -4.740 | 0.569 | 1.661 | 20.401 | -3.872 | plastic |
| 442 | | 5.401 | 0.293 | | | | |
| 451 | Cover glass | ∞ | 0.300 | | | | glass |
| 452 | | ∞ | 0.370 | | | | |
| 460 | Image plane | ∞ | 0.000 | | | | |

FIG. 20

| Aspherical parameters | | | | |
|---|---|---|---|---|
| Surface# | 411 | 412 | 421 | 422 |
| K | | 0.000E+00 | 0.000E+00 | 0.000E+00 |
| $a_2$ | | 0.000E+00 | 0.000E+00 | 0.000E+00 |
| $a_4$ | | -6.514E-03 | -3.212E-02 | 1.792E-04 |
| $a_6$ | | 2.956E-04 | 1.592E-03 | 3.844E-03 |
| $a_8$ | | -3.293E-04 | -6.611E-04 | -2.085E-03 |
| $a_{10}$ | | 0.000E+00 | 0.000E+00 | 5.177E-04 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 431 | 432 | 441 | 442 |
| K | | | 0.000E+00 | 0.000E+00 |
| $a_2$ | | | 0.000E+00 | 0.000E+00 |
| $a_4$ | | | -1.610E-01 | -1.005E-01 |
| $a_6$ | | | 1.671E-02 | 2.289E-02 |
| $a_8$ | | | -1.233E-02 | -5.926E-03 |
| $a_{10}$ | | | 0.000E+00 | 6.119E-04 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 21

| EFL (Effective focus length) = 1.721 mm, HFOV (Half angular field of view) = 73.027 deg., TTL (System length) = 7.647 mm, Image height= 2.112 mm, Fno = 2.750 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 511 | 1st lens element | 150.000 | 0.759 | 1.545 | 55.987 | -2.277 | plastic |
| 512 | | 1.211 | 1.407 | | | | |
| 521 | 2nd lens element | 3.785 | 1.044 | 1.545 | 55.987 | 3.015 | plastic |
| 522 | | -2.556 | 0.148 | | | | |
| 500 | Aperture stop | ∞ | 0.809 | | | | |
| 531 | 3rd lens element | 3.197 | 1.069 | 1.517 | 64.198 | 2.595 | glass |
| 532 | | -2.002 | 0.655 | | | | |
| 541 | 4th lens element | -6.241 | 0.785 | 1.661 | 20.401 | -3.578 | plastic |
| 542 | | 3.776 | 0.301 | | | | |
| 551 | Cover glass | ∞ | 0.300 | | | | glass |
| 552 | | ∞ | 0.370 | | | | |
| 560 | Image plane | ∞ | 0.000 | | | | |

FIG. 24

| Aspherical parameters | | | | |
|---|---|---|---|---|
| Surface# | 511 | 512 | 521 | 522 |
| K | | 0.000E+00 | 0.000E+00 | 0.000E+00 |
| $a_2$ | | 0.000E+00 | 0.000E+00 | 0.000E+00 |
| $a_4$ | | -2.479E-02 | -4.703E-03 | 2.739E-02 |
| $a_6$ | | 4.809E-03 | -8.945E-03 | -5.381E-02 |
| $a_8$ | | -1.247E-02 | 3.554E-02 | 1.793E-01 |
| $a_{10}$ | | 0.000E+00 | 0.000E+00 | -1.537E-01 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 531 | 532 | 541 | 542 |
| K | | | 0.000E+00 | 0.000E+00 |
| $a_2$ | | | 0.000E+00 | 0.000E+00 |
| $a_4$ | | | -1.710E-01 | -8.829E-02 |
| $a_6$ | | | 6.959E-03 | 2.007E-02 |
| $a_8$ | | | -2.263E-02 | -4.978E-03 |
| $a_{10}$ | | | 0.000E+00 | 4.245E-04 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 25

| EFL (Effective focus length) = 1.953 mm, HFOV (Half angular field of view) = 73.049 deg., TTL (System length) = 13.355 mm, Image height= 2.100 mm, Fno = 2.715 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 611 | 1st lens element | 100.000 | 0.227 | 1.545 | 55.987 | -6.198 | plastic |
| 612 | | 3.218 | 4.252 | | | | |
| 621 | 2nd lens element | -9.972 | 2.846 | 1.545 | 55.987 | 6.916 | plastic |
| 622 | | -2.976 | 0.637 | | | | |
| 600 | Aperture stop | ∞ | 0.192 | | | | |
| 631 | 3rd lens element | 3.697 | 2.892 | 1.517 | 64.198 | 3.613 | glass |
| 632 | | -2.702 | 1.153 | | | | |
| 641 | 4th lens element | -2.129 | 0.236 | 1.661 | 20.401 | -3.550 | plastic |
| 642 | | -36.884 | 0.250 | | | | |
| 651 | Cover glass | ∞ | 0.300 | | | | glass |
| 652 | | ∞ | 0.370 | | | | |
| 660 | Image plane | ∞ | 0.000 | | | | |

FIG. 28

| Aspherical parameters | | | | |
|---|---|---|---|---|
| Surface# | 611 | 612 | 621 | 622 |
| K | | 0.000E+00 | 0.000E+00 | 0.000E+00 |
| $a_2$ | | 0.000E+00 | 0.000E+00 | 0.000E+00 |
| $a_4$ | | -2.915E-03 | -1.246E-02 | 5.794E-03 |
| $a_6$ | | 8.506E-05 | 6.305E-04 | 9.278E-04 |
| $a_8$ | | -9.491E-06 | -1.446E-04 | -1.065E-03 |
| $a_{10}$ | | 0.000E+00 | 0.000E+00 | 3.027E-04 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 631 | 632 | 641 | 642 |
| K | | | 0.000E+00 | 0.000E+00 |
| $a_2$ | | | 0.000E+00 | 0.000E+00 |
| $a_4$ | | | -1.549E-01 | -9.700E-02 |
| $a_6$ | | | 4.869E-02 | 2.631E-02 |
| $a_8$ | | | -3.064E-03 | -3.785E-03 |
| $a_{10}$ | | | 0.000E+00 | 3.626E-04 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 29

| EFL (Effective focus length) = 1.863 mm, HFOV (Half angular field of view) = 73.069 deg., TTL (System length) = 13.609 mm, Image height= 2.111 mm, Fno = 2.716 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 711 | 1st lens element | 70.000 | 2.443 | 1.545 | 55.987 | -4.110 | plastic |
| 712 | | 2.113 | 3.211 | | | | |
| 721 | 2nd lens element | -8.202 | 1.818 | 1.545 | 55.987 | 5.674 | plastic |
| 722 | | -2.394 | 0.065 | | | | |
| 700 | Aperture stop | ∞ | 0.094 | | | | |
| 731 | 3rd lens element | 5.823 | 3.013 | 1.517 | 64.198 | 3.862 | glass |
| 732 | | -2.455 | 1.206 | | | | |
| 741 | 4th lens element | -15.360 | 0.794 | 1.661 | 20.401 | -4.953 | plastic |
| 742 | | 4.060 | 0.295 | | | | |
| 751 | Cover glass | ∞ | 0.300 | | | | glass |
| 752 | | ∞ | 0.370 | | | | |
| 760 | Image plane | ∞ | 0.000 | | | | |

FIG. 32

| Aspherical parameters | | | | |
|---|---|---|---|---|
| Surface # | 711 | 712 | 721 | 722 |
| K | | 0.000E+00 | 0.000E+00 | 0.000E+00 |
| $a_2$ | | 0.000E+00 | 0.000E+00 | 0.000E+00 |
| $a_4$ | | -3.933E-03 | -1.678E-02 | 7.008E-03 |
| $a_6$ | | 9.054E-04 | 1.843E-04 | 9.802E-03 |
| $a_8$ | | -4.109E-04 | 1.757E-04 | -1.402E-02 |
| $a_{10}$ | | 0.000E+00 | 0.000E+00 | 8.723E-03 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 731 | 732 | 741 | 742 |
| K | | | 0.000E+00 | 0.000E+00 |
| $a_2$ | | | 0.000E+00 | 0.000E+00 |
| $a_4$ | | | -9.458E-02 | -8.834E-02 |
| $a_6$ | | | 2.118E-02 | 2.890E-02 |
| $a_8$ | | | -5.781E-03 | -6.391E-03 |
| $a_{10}$ | | | 0.000E+00 | 4.707E-04 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 33

| EFL (Effective focus length) = 1.852 mm, HFOV (Half angular field of view) = 73.047 deg., TTL (System length) = 13.645 mm, Image height= 2.124 mm, Fno = 2.743 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 811 | 1st lens element | 70.000 | 4.441 | 1.545 | 55.987 | -4.105 | plastic |
| 812 | | 2.089 | 2.987 | | | | |
| 821 | 2nd lens element | -9.079 | 1.333 | 1.545 | 55.987 | 5.684 | plastic |
| 822 | | -2.401 | 0.114 | | | | |
| 800 | Aperture stop | ∞ | 0.124 | | | | |
| 831 | 3rd lens element | 5.778 | 1.659 | 1.517 | 64.198 | 3.491 | glass |
| 832 | | -2.322 | 1.699 | | | | |
| 841 | 4th lens element | -6.575 | 0.334 | 1.661 | 20.401 | -4.795 | plastic |
| 842 | | 5.836 | 0.283 | | | | |
| 851 | Cover glass | ∞ | 0.300 | | | | glass |
| 852 | | ∞ | 0.370 | | | | |
| 860 | Image plane | ∞ | 0.000 | | | | |

FIG. 36

| Aspherical parameters | | | | |
|---|---|---|---|---|
| Surface# | 811 | 812 | 821 | 822 |
| K | | 0.000E+00 | 0.000E+00 | 0.000E+00 |
| $a_2$ | | 0.000E+00 | 0.000E+00 | 0.000E+00 |
| $a_4$ | | -4.168E-03 | -4.407E-02 | 4.846E-03 |
| $a_6$ | | 3.212E-04 | 3.745E-03 | -3.728E-03 |
| $a_8$ | | -2.190E-04 | 1.004E-04 | 2.045E-02 |
| $a_{10}$ | | 0.000E+00 | 0.000E+00 | -1.562E-02 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 831 | 832 | 841 | 842 |
| K | | | 0.000E+00 | 0.000E+00 |
| $a_2$ | | | 0.000E+00 | 0.000E+00 |
| $a_4$ | | | -1.633E-01 | -1.166E-01 |
| $a_6$ | | | 2.147E-02 | 2.580E-02 |
| $a_8$ | | | -6.726E-03 | -6.018E-03 |
| $a_{10}$ | | | 0.000E+00 | 5.768E-04 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 37

| EFL (Effective focus length) = 1.916 mm, HFOV (Half angular field of view) = 73.037 deg., TTL (System length) = 10.991 mm, Image height= 2.099 mm, Fno = 2.759 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 911 | 1st lens element | 150.000 | 0.254 | 1.545 | 55.987 | -3.840 | plastic |
| 912 | | 2.033 | 2.729 | | | | |
| 921 | 2nd lens element | -8.108 | 1.954 | 1.545 | 55.987 | 5.685 | plastic |
| 922 | | -2.404 | 0.214 | | | | |
| 900 | Aperture stop | ∞ | 0.321 | | | | |
| 931 | 3rd lens element | 6.144 | 1.759 | 1.517 | 64.198 | 3.491 | glass |
| 932 | | -2.264 | 1.084 | | | | |
| 941 | 4th lens element | -5.267 | 1.717 | 1.661 | 20.401 | -4.209 | plastic |
| 942 | | 6.175 | 0.288 | | | | |
| 951 | Cover glass | ∞ | 0.300 | | | | glass |
| 952 | | ∞ | 0.370 | | | | |
| 960 | Image plane | ∞ | 0.000 | | | | |

FIG. 40

| Aspherical parameters | | | | |
|---|---|---|---|---|
| Surface# | 911 | 912 | 921 | 922 |
| K | | 0.000E+00 | 0.000E+00 | 0.000E+00 |
| $a_2$ | | 0.000E+00 | 0.000E+00 | 0.000E+00 |
| $a_4$ | | -4.391E-03 | -2.679E-02 | 9.890E-03 |
| $a_6$ | | 5.360E-04 | 6.248E-03 | 1.235E-02 |
| $a_8$ | | -7.106E-04 | -9.149E-04 | -2.509E-03 |
| $a_{10}$ | | 0.000E+00 | 0.000E+00 | -4.150E-03 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 931 | 932 | 941 | 942 |
| K | | | 0.000E+00 | 0.000E+00 |
| $a_2$ | | | 0.000E+00 | 0.000E+00 |
| $a_4$ | | | -5.478E-02 | -6.419E-02 |
| $a_6$ | | | 1.773E-02 | 2.936E-02 |
| $a_8$ | | | -6.040E-03 | -6.441E-03 |
| $a_{10}$ | | | 0.000E+00 | 4.585E-04 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 41

| EFL ( Effective focus length ) = 2.164 mm, HFOV ( Half angular field of view) = 73.050 deg., TTL ( System length ) = 9.110 mm, Image height= 2.099 mm, Fno = 2.736 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 1011 | 1st lens element | 70.000 | 0.256 | 1.545 | 55.987 | -5.058 | plastic |
| 1012 | | 2.611 | 2.449 | | | | |
| 1021 | 2nd lens element | -11.927 | 1.572 | 1.545 | 55.987 | 4.837 | plastic |
| 1022 | | -2.231 | 0.040 | | | | |
| 1000 | Aperture stop | ∞ | 0.096 | | | | |
| 1031 | 3rd lens element | 4.725 | 2.003 | 1.517 | 64.198 | 3.180 | glass |
| 1032 | | -2.115 | 0.877 | | | | |
| 1041 | 4th lens element | -3.824 | 0.630 | 1.661 | 20.401 | -3.113 | plastic |
| 1042 | | 4.398 | 0.517 | | | | |
| 1051 | Cover glass | ∞ | 0.300 | | | | glass |
| 1052 | | ∞ | 0.370 | | | | |
| 1060 | Image plane | ∞ | 0.000 | | | | |

FIG. 44

| Aspherical parameters | | | | |
|---|---|---|---|---|
| Surface# | 1011 | 1012 | 1021 | 1022 |
| K | | 0.000E+00 | 0.000E+00 | 0.000E+00 |
| $a_2$ | | 0.000E+00 | 0.000E+00 | 0.000E+00 |
| $a_4$ | | 3.946E-03 | -4.469E-02 | 6.696E-04 |
| $a_6$ | | -9.080E-04 | -8.354E-04 | 9.390E-03 |
| $a_8$ | | 4.907E-04 | -1.674E-03 | -1.983E-03 |
| $a_{10}$ | | 0.000E+00 | 0.000E+00 | -6.021E-03 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 1031 | 1032 | 1041 | 1042 |
| K | | | 0.000E+00 | 0.000E+00 |
| $a_2$ | | | 0.000E+00 | 0.000E+00 |
| $a_4$ | | | -1.331E-01 | -1.052E-01 |
| $a_6$ | | | 1.905E-02 | 2.646E-02 |
| $a_8$ | | | -3.915E-03 | -6.190E-03 |
| $a_{10}$ | | | 0.000E+00 | 6.895E-04 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 45

| EFL ( Effective focus length ) = 1.864 mm, HFOV ( Half angular field of view) = 72.998 deg., TTL (System length) = 8.967 mm, Image height= 2.104 mm, Fno = 2.757 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 1111' | 1st lens element | 154.445 | 0.260 | 1.545 | 55.987 | -3.585 | plastic |
| 1112' | | 1.900 | 2.180 | | | | |
| 1121' | 2nd lens element | -8.429 | 1.541 | 1.545 | 55.987 | 5.671 | plastic |
| 1122' | | -2.380 | 0.313 | | | | |
| 1100 | Aperture stop | ∞ | 0.099 | | | | |
| 1131 | 3rd lens element | 5.928 | 1.364 | 1.517 | 64.198 | 3.446 | glass |
| 1132 | | -2.303 | 1.813 | | | | |
| 1141 | 4th lens element | -15.261 | 0.427 | 1.661 | 20.401 | -5.683 | plastic |
| 1142 | | 4.808 | 0.299 | | | | |
| 1161 | Cover glass | ∞ | 0.300 | | | | glass |
| 1162 | | ∞ | 0.370 | | | | |
| 1180 | Image plane | ∞ | 0.000 | | | | |

FIG. 48

| Aspherical parameters | | | | |
|---|---|---|---|---|
| Surface# | 1111' | 1112' | 1121' | 1122' |
| K | | 0.000E+00 | 0.000E+00 | 0.000E+00 |
| $a_2$ | | 0.000E+00 | 0.000E+00 | 0.000E+00 |
| $a_4$ | | -7.689E-03 | -4.218E-02 | 8.619E-03 |
| $a_6$ | | 4.240E-05 | 2.447E-03 | 8.141E-03 |
| $a_8$ | | -6.591E-04 | 1.240E-03 | -2.736E-03 |
| $a_{10}$ | | 0.000E+00 | 0.000E+00 | -3.000E-04 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 1131 | 1132 | 1141 | 1142 |
| K | | | 0.000E+00 | 0.000E+00 |
| $a_2$ | | | 0.000E+00 | 0.000E+00 |
| $a_4$ | | | -1.490E-01 | -1.085E-01 |
| $a_6$ | | | 1.972E-02 | 2.570E-02 |
| $a_8$ | | | -8.440E-03 | -6.398E-03 |
| $a_{10}$ | | | 0.000E+00 | 5.502E-04 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 49

| EFL ( Effective focus length ) = 1.873 mm, HFOV ( Half angular field of view ) 73.016 deg., TTL ( System length ) = 10.885 mm, Image height= 2.095 mm, Fno = 2.785 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 1211' | 1st lens element | 107.333 | 0.260 | 1.545 | 55.987 | -4.830 | plastic |
| 1212' | | 2.530 | 2.902 | | | | |
| 1221' | 2nd lens element | -7.374 | 2.232 | 1.545 | 55.987 | 7.331 | plastic |
| 1222' | | -2.838 | 0.576 | | | | |
| 1200 | Aperture stop | ∞ | 0.100 | | | | |
| 1231 | 3rd lens element | 2.991 | 2.232 | 1.517 | 64.198 | 3.506 | glass |
| 1232 | | -3.321 | 1.339 | | | | |
| 1241 | 4th lens element | 34.321 | 0.265 | 1.661 | 20.401 | -4.777 | plastic |
| 1242 | | 2.791 | 0.310 | | | | |
| 1251 | Cover glass | ∞ | 0.300 | | | | glass |
| 1252 | | ∞ | 0.370 | | | | |
| 1260 | Image plane | ∞ | 0.000 | | | | |

FIG. 52

| Aspherical parameters | | | | |
|---|---|---|---|---|
| Surface# | 1211' | 1212' | 1221' | 1222' |
| K | | 0.000E+00 | 0.000E+00 | 0.000E+00 |
| $a_2$ | | 0.000E+00 | 0.000E+00 | 0.000E+00 |
| $a_4$ | | -6.889E-03 | -2.182E-02 | 3.129E-03 |
| $a_6$ | | 5.239E-04 | 1.314E-03 | 1.790E-03 |
| $a_8$ | | -1.476E-04 | -3.232E-05 | -3.355E-04 |
| $a_{10}$ | | 0.000E+00 | 0.000E+00 | -8.615E-05 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 1231 | 1232 | 1241 | 1242 |
| K | | | 0.000E+00 | 0.000E+00 |
| $a_2$ | | | 0.000E+00 | 0.000E+00 |
| $a_4$ | | | -2.778E-01 | -2.165E-01 |
| $a_6$ | | | 3.965E-02 | 5.595E-02 |
| $a_8$ | | | -6.135E-03 | -1.200E-02 |
| $a_{10}$ | | | 0.000E+00 | 1.163E-03 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 53

| EFL ( Effective focus length ) = 1.842 mm, HFOV ( Half angular field of view ) = 73.055deg., TTL (System length) = 10.969 mm, Image height= 2.126 mm, Fno = 2.716 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 1311' | 1st lens element | 69.958 | 1.100 | 1.545 | 55.987 | -5.302 | plastic |
| 1312' | | 2.719 | 4.147 | | | | |
| 1300 | Aperture stop | ∞ | 0.030 | | | | |
| 1321' | 2nd lens element | -11.541 | 1.112 | 1.545 | 55.987 | 5.342 | plastic |
| 1322' | | -2.373 | 0.564 | | | | |
| 1331 | 3rd lens element | 5.337 | 1.168 | 1.517 | 64.198 | 3.543 | glass |
| 1332 | | -2.528 | 1.326 | | | | |
| 1341 | 4th lens element | -34.778 | 0.466 | 1.661 | 20.401 | -3.829 | plastic |
| 1342 | | 2.642 | 0.386 | | | | |
| 1351 | Cover glass | ∞ | 0.300 | | | | glass |
| 1352 | | ∞ | 0.370 | | | | |
| 1360 | Image plane | ∞ | 0.000 | | | | |

FIG. 56

| Aspherical parameters | | | | |
|---|---|---|---|---|
| Surface# | 1311' | 1312' | 1321' | 1322' |
| K | | 0.000E+00 | 0.000E+00 | 0.000E+00 |
| $a_2$ | | 0.000E+00 | 0.000E+00 | 0.000E+00 |
| $a_4$ | | -1.322E-03 | -6.093E-02 | -1.159E-02 |
| $a_6$ | | 1.217E-06 | 1.154E-02 | 3.028E-03 |
| $a_8$ | | -5.134E-06 | -3.554E-02 | -1.208E-02 |
| $a_{10}$ | | 0.000E+00 | 0.000E+00 | 9.849E-03 |
| $a_{12}$ | | 0.000E+00 | 0.000E+00 | 0.000E+00 |
| $a_{14}$ | | 0.000E+00 | 0.000E+00 | 0.000E+00 |
| $a_{16}$ | | 0.000E+00 | 0.000E+00 | 0.000E+00 |
| Surface# | 1331 | 1332 | 1341 | 1342 |
| K | | | 0.000E+00 | 0.000E+00 |
| $a_2$ | | | 0.000E+00 | 0.000E+00 |
| $a_4$ | | | -1.508E-01 | -1.193E-01 |
| $a_6$ | | | 1.525E-02 | 2.854E-02 |
| $a_8$ | | | -1.350E-03 | -5.395E-03 |
| $a_{10}$ | | | 0.000E+00 | 4.519E-04 |
| $a_{12}$ | | | 0.000E+00 | 0.000E+00 |
| $a_{14}$ | | | 0.000E+00 | 0.000E+00 |
| $a_{16}$ | | | 0.000E+00 | 0.000E+00 |

FIG. 57

| Embodiment | 1st | 2nd | 3rd | 4th | 5th | 6th |
|---|---|---|---|---|---|---|
| T1 | 4.708 | 0.260 | 1.657 | 1.523 | 0.759 | 0.227 |
| G12 | 2.695 | 2.142 | 1.810 | 2.361 | 1.407 | 4.252 |
| T2 | 1.261 | 1.633 | 1.391 | 1.730 | 1.044 | 2.846 |
| G23 | 0.929 | 0.260 | 0.590 | 0.516 | 0.957 | 0.829 |
| T3 | 0.646 | 1.611 | 1.389 | 2.303 | 1.069 | 2.892 |
| G34 | 1.705 | 1.768 | 1.682 | 0.930 | 0.655 | 1.153 |
| T4 | 0.396 | 0.372 | 0.268 | 0.569 | 0.785 | 0.236 |
| EFL | 1.832 | 1.859 | 1.867 | 1.865 | 1.721 | 1.953 |
| TL | 12.340 | 8.045 | 8.788 | 9.932 | 6.677 | 12.435 |
| BFL | 0.670 | 0.670 | 0.670 | 0.670 | 0.670 | 0.670 |
| ALT | 7.011 | 3.875 | 4.706 | 6.125 | 3.658 | 6.200 |
| Gaa | 5.329 | 4.170 | 4.082 | 3.807 | 3.019 | 6.234 |
| TTL | 13.303 | 9.020 | 9.754 | 10.895 | 7.647 | 13.355 |
| TTL/(T2+G34) | 4.486 | 2.652 | 3.174 | 4.096 | 4.501 | 3.340 |
| G12/T2 | 2.138 | 1.312 | 1.301 | 1.364 | 1.348 | 1.494 |
| TTL/G12 | 4.936 | 4.210 | 5.390 | 4.615 | 5.433 | 3.140 |
| ALT/(G12+G34) | 1.594 | 0.991 | 1.348 | 1.862 | 1.774 | 1.147 |
| TTL/(G12+G34) | 3.024 | 2.307 | 2.794 | 3.311 | 3.708 | 2.471 |
| ALT/G12 | 2.602 | 1.809 | 2.600 | 2.595 | 2.599 | 1.458 |
| (T2+T3)/G34 | 1.118 | 1.834 | 1.653 | 4.339 | 3.227 | 4.977 |
| (G12+T3)/T2 | 2.650 | 2.299 | 2.300 | 2.695 | 2.372 | 2.511 |
| Gaa/T2 | 4.227 | 2.554 | 2.934 | 2.200 | 2.892 | 2.191 |
| TL/(G12+G34 | 2.805 | 2.057 | 2.517 | 3.019 | 3.237 | 2.300 |
| (G12+G34)/T2 | 3.490 | 2.395 | 2.510 | 1.901 | 1.975 | 1.899 |
| T3/G34 | 0.379 | 0.911 | 0.826 | 2.478 | 1.633 | 2.509 |
| (T2+G23)/G34 | 1.285 | 1.071 | 1.178 | 2.417 | 3.054 | 3.188 |
| ALT/G34 | 4.113 | 2.192 | 2.798 | 6.590 | 5.585 | 5.379 |
| TTL/G34 | 7.803 | 5.102 | 5.800 | 11.721 | 11.676 | 11.585 |
| TL/G34 | 7.238 | 4.550 | 5.225 | 10.685 | 10.194 | 10.787 |
| (T2+T1)/G34 | 3.501 | 1.071 | 1.812 | 3.500 | 2.753 | 2.665 |
| (T4+T2)/G34 | 0.972 | 1.134 | 0.987 | 2.474 | 2.793 | 2.673 |
| EFL/G34 | 1.075 | 1.051 | 1.110 | 2.006 | 2.628 | 1.694 |
| (T4+T3)/G34 | 0.611 | 1.121 | 0.986 | 3.090 | 2.832 | 2.713 |

FIG. 58A

| Embodiment | 7th | 8th | 9th | 10th | 11th | 12th | 13th |
|---|---|---|---|---|---|---|---|
| T1 | 2.443 | 4.441 | 0.254 | 0.256 | 0.260 | 0.260 | 1.100 |
| G12 | 3.211 | 2.987 | 2.729 | 2.449 | 2.180 | 2.902 | 4.177 |
| T2 | 1.818 | 1.333 | 1.954 | 1.572 | 1.541 | 2.232 | 1.112 |
| G23 | 0.159 | 0.238 | 0.535 | 0.136 | 0.412 | 0.676 | 0.564 |
| T3 | 3.013 | 1.659 | 1.759 | 2.003 | 1.364 | 2.232 | 1.168 |
| G34 | 1.206 | 1.699 | 1.084 | 0.877 | 1.813 | 1.339 | 1.326 |
| T4 | 0.794 | 0.334 | 1.717 | 0.630 | 0.427 | 0.265 | 0.466 |
| EFL | 1.863 | 1.852 | 1.916 | 2.164 | 1.864 | 1.873 | 1.842 |
| TL | 12.644 | 12.692 | 10.033 | 7.924 | 7.998 | 9.905 | 9.914 |
| BFL | 0.670 | 0.670 | 0.670 | 0.670 | 0.670 | 0.670 | 0.670 |
| ALT | 8.069 | 7.768 | 5.685 | 4.461 | 3.593 | 4.989 | 3.846 |
| Gaa | 4.576 | 4.924 | 4.348 | 3.462 | 4.405 | 4.917 | 6.067 |
| TTL | 13.609 | 13.645 | 10.991 | 9.110 | 8.967 | 10.885 | 10.969 |
| TTL/(T2+G34) | 4.500 | 4.500 | 3.618 | 3.720 | 2.673 | 3.048 | 4.501 |
| G12/T2 | 1.766 | 2.240 | 1.397 | 1.558 | 1.415 | 1.300 | 3.758 |
| TTL/G12 | 4.238 | 4.568 | 4.027 | 3.720 | 4.113 | 3.751 | 2.626 |
| ALT/(G12+G34) | 1.827 | 1.658 | 1.491 | 1.341 | 0.900 | 1.176 | 0.699 |
| TTL/(G12+G34) | 3.081 | 2.912 | 2.882 | 2.739 | 2.245 | 2.567 | 1.993 |
| ALT/G12 | 2.513 | 2.600 | 2.083 | 1.822 | 1.648 | 1.719 | 0.921 |
| (T2+T3)/G34 | 4.006 | 1.762 | 3.426 | 4.077 | 1.603 | 3.333 | 1.720 |
| (G12+T3)/T2 | 3.423 | 3.485 | 2.297 | 2.832 | 2.300 | 2.300 | 4.809 |
| Gaa/T2 | 2.516 | 3.693 | 2.225 | 2.202 | 2.859 | 2.203 | 5.458 |
| TL/(G12+G34 | 2.863 | 2.709 | 2.631 | 2.383 | 2.003 | 2.336 | 1.801 |
| (G12+G34)/T2 | 2.429 | 3.514 | 1.951 | 2.115 | 2.591 | 1.900 | 4.951 |
| T3/G34 | 2.498 | 0.977 | 1.623 | 2.284 | 0.753 | 1.667 | 0.881 |
| (T2+G23)/G34 | 1.640 | 0.925 | 2.297 | 1.949 | 1.077 | 2.171 | 1.264 |
| ALT/G34 | 6.691 | 4.573 | 5.245 | 5.088 | 1.982 | 3.725 | 2.902 |
| TTL/G34 | 11.286 | 8.033 | 10.141 | 10.390 | 4.946 | 8.127 | 8.275 |
| TL/G34 | 10.486 | 7.472 | 9.257 | 9.037 | 4.412 | 7.396 | 7.479 |
| (T2+T1)/G34 | 3.534 | 3.399 | 2.038 | 2.085 | 0.993 | 1.861 | 1.669 |
| (T4+T2)/G34 | 2.166 | 0.982 | 3.387 | 2.512 | 1.086 | 1.864 | 1.190 |
| EFL/G34 | 1.545 | 1.090 | 1.768 | 2.468 | 1.028 | 1.399 | 1.390 |
| (T4+T3)/G34 | 3.157 | 1.173 | 3.207 | 3.003 | 0.988 | 1.864 | 1.233 |

FIG. 58B

OPTICAL IMAGING LENS

CROSS-REFERENCE TO RELATED APPLICATIONS

This application claims priority to P.R.C. Patent Application No. 201610523509.3 filed on Jul. 5, 2016, which is hereby incorporated by reference in its entirety.

TECHNICAL FIELD

The present disclosure relates to an optical imaging lens, and particularly, to an optical imaging lens having four lens elements.

BACKGROUND

Technology improves every day, continuously expanding consumer demand for increasingly compact electronic devices, for example, mobile phones, cameras, tablet personal computers, personal digital assistants, vehicle camera device, VR tracker, etc. In that key components for the optical imaging lenses incorporated into consumer electronic products should keep pace with technological improvements in order to meet the expectations of consumers' expectations. Some important characteristics of an optical imaging lens include image quality and size. However, reducing the size of the imaging lens while achieving good optical characteristics and enlarging field of view and aperture in respect to driving or an insufficient light environment presents challenging problems. For example, in a typical optical imaging lens system having four lens elements, the distance from the object side surface of the first lens element to an image plane along the optical axis is too large to accommodate the slim profile of today's cell phones or digital cameras.

Decreasing the dimensions of an optical lens while maintaining good optical performance may not only be achieved by scaling down the lens. Rather, these benefits may be realized by improving other aspects of the design process, such as by varying the material used for the lens, or adjusting the assembly yield.

In this manner, there is a continuing need for improving the design characteristics of small sized optical lenses. Achieving these advancements may require overcoming unique challenges, even when compared to design improvements for traditional optical lenses. However, refining aspects of the optical lens manufacturing process that result in a lens that meets consumer demand and provides upgrades to imaging quality are always desirable objectives for industries, governments, and academia.

SUMMARY

The present disclosure provides for an optical imaging lens. By controlling the convex or concave shape of the surfaces of each lens element and the parameters in at least one equation, the length of the optical imaging lens may be shortened while maintaining good optical characteristics and system functionality.

In some embodiments, an optical imaging lens may comprise sequentially from an object side to an image side along an optical axis, first, second, third and fourth lens elements and a cover glass. Each of the first, second, third and fourth lens elements may have refracting power. Additionally, the optical imaging lens may comprise an object-side surface facing toward the object side, an image-side surface facing toward the image side, and a central thickness defined along the optical axis.

According to some embodiments of the optical imaging lens of the present disclosure, the object-side surface of the first lens element may comprise a convex portion in a vicinity of the optical axis; the image-side surface of the first lens element may comprise a concave portion in a vicinity of a periphery of the first lens element; the second lens element may have positive refracting power; the image-side surface of the second lens element may comprise a convex portion in a vicinity of the optical axis; the object-side surface of the third lens element may comprise a convex portion in a vicinity of the optical axis; the object-side surface of the fourth lens element may comprise a concave portion in a vicinity of a periphery of the fourth lens element; the image-side surface of the fourth lens element may comprise a convex portion in a vicinity of a periphery of the fourth lens element; and the optical imaging lens may comprise no other lenses having refracting power beyond the four lens elements. Further, a distance between the object-side surface of the first lens element and an image plane along the optical axis is represented by TTL, a central thickness of the second lens element along the optical axis is represented by T2, an air gap between the third lens element and the fourth lens element along the optical axis is represented by G34, and TTL, T2 and G34 could be controlled to satisfy the equation as follows:

$$TTL/(T2+G34)\leq 4.5 \quad \text{Equation (1).}$$

In other exemplary embodiments, other parameters could be taken into consideration. For example, an air gap between the first lens element and the second lens element along the optical axis is represented by G12, and G12 and T2 could be controlled to satisfy the equation as follows:

$$G12/T2\geq 1.3 \quad \text{Equation (2);}$$

TTL and G12 could be controlled to satisfy the equation as follows:

$$TTL/G12\leq 5.4 \quad \text{Equation (3);}$$

a sum of the central thicknesses of all lens elements is represented by ALT, and ALT, G12 and G34 could be controlled to satisfy the equation as follows:

$$ALT/(G12+G34)\leq 2 \quad \text{Equation (4);}$$

TTL, G12 and G34 could be controlled to satisfy the equation as follows:

$$TTL/(G12+G34)\leq 4 \quad \text{Equation (5);}$$

ALT and G12 could be controlled to satisfy the equation as follows:

$$ALT/G12\leq 2.6 \quad \text{Equation (6);}$$

a central thickness of the third lens element along the optical axis is represented by T3, and G34, T2 and T3 could be controlled to satisfy the equation as follows:

$$(T2+T3)/G34\leq 5 \quad \text{Equation (7);}$$

G12, T3 and T2 could be controlled to satisfy the equation as follows:

$$(G12+T3)/T2\geq 2.3 \quad \text{Equation (8);}$$

a sum of all air gaps between all lens elements along the optical axis is represented by Gaa, and Gaa and T2 could be controlled to satisfy the equation as follows:

$$Gaa/T2\geq 2.2 \quad \text{Equation (9);}$$

a distance from the object-side surface of the first lens element to the image-side surface of the fourth lens element along the optical axis is represented by TL, and TL, G12 and G34 could be controlled to satisfy the equation as follows:

$$TL/(G12+G34)\leq 3.2 \quad \text{Equation (10);}$$

G12, G34 and T2 could be controlled to satisfy the equation as follows:

$$(G12+G34)/T2\geq 1.9 \quad \text{Equation (11);}$$

T3 and G34 could be controlled to satisfy the equation as follows:

$$T3/G34\leq 2.5 \quad \text{Equation (12);}$$

an air gap between the second lens element and the third lens element along the optical axis G23, and T2, G23 and G34 could be controlled to satisfy the equation as follows:

$$(T2+G23)/G34\leq 3.5 \quad \text{Equation (13);}$$

ALT and G34 could be controlled to satisfy the equation as follows:

$$ALT/G34\leq 6.9 \quad \text{Equation (14);}$$

TTL and G34 could be controlled to satisfy the equation as follows:

$$TTL/G34\leq 13.7 \quad \text{Equation (15);}$$

TL and G34 could be controlled to satisfy the equation as follows:

$$TL/G34\leq 11 \quad \text{Equation (16);}$$

a central thickness of the first lens element along the optical axis is represented by T1, and T1, T2 and G34 could be controlled to satisfy the equation as follows:

$$(T2+T1)/G34\leq 3.5 \quad \text{Equation (17);}$$

a central thickness of the fourth lens element along the optical axis is represented by T4, and T4, T2 and G34 could be controlled to satisfy the equation as follows:

$$(T4+T2)/G34\leq 3.5 \quad \text{Equation (18);}$$

a back focal length of the optical imaging lens is represetned by EFL, and EFL and G34 could be controlled to satisfy the equation as follows:

$$EFL/G34\leq 2.6 \quad \text{Equation (19); or}$$

T4, T3 and G34 could be controlled to satisfy the equation as follows:

$$(T4+T3)/G34\leq 3.2 \quad \text{Equation (20).}$$

Aforesaid embodiments are not limited and could be selectively incorporated in other embodiments described herein. In some embodiments, more details about the convex or concave surface structure could be incorporated for one specific lens element or broadly for plural lens elements to enhance the control for the system performance and/or resolution. It is noted that the details listed here could be incorporated into example embodiments if no inconsistency occurs.

By controlling the convex or concave shape of the surfaces, exemplary embodiments of the optical imaging lens systems herein achieve good optical characteristics, provide an enlarged aperture and field of view, increase assembly yield, and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 8 depicts a table of optical data for each lens element of the optical imaging lens of a first embodiment of the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of a sixth embodiment of an optical imaging lens according to the present disclosure;

FIG. 29 depicts a table of aspherical data of a sixth embodiment of the optical imaging lens according to the present disclosure;

FIG. 32 depicts a table of optical data for each lens element of the optical imaging lens of a seventh embodiment of the present disclosure;

FIG. 33 depicts a table of aspherical data of a seventh embodiment of the optical imaging lens according to the present disclosure;

FIG. 36 depicts a table of optical data for each lens element of the optical imaging lens of an eighth embodiment of the present disclosure;

FIG. 37 depicts a table of aspherical data of an eighth embodiment of the optical imaging lens according to the present disclosure;

FIG. 40 depicts a table of optical data for each lens element of the optical imaging lens of a ninth embodiment of the present disclosure;

FIG. 41 depicts a table of aspherical data of a ninth embodiment of the optical imaging lens according to the present disclosure;

FIG. 44 depicts a table of optical data for each lens element of the optical imaging lens of a tenth embodiment of the present disclosure;

FIG. 45 depicts a table of aspherical data of a tenth embodiment of the optical imaging lens according to the present disclosure;

FIG. 48 depicts a table of optical data for each lens element of the optical imaging lens of an eleventh embodiment of the present disclosure;

FIG. 49 depicts a table of aspherical data of an eleventh embodiment of the optical imaging lens according to the present disclosure;

FIG. 52 depicts a table of optical data for each lens element of the optical imaging lens of a twelfth embodiment of the present disclosure;

FIG. 53 depicts a table of aspherical data of a twelfth embodiment of the optical imaging lens according to the present disclosure;

FIG. 56 depicts a table of optical data for each lens element of the optical imaging lens of a thirteenth embodiment of the present disclosure;

FIG. 57 depicts a table of aspherical data of a thirteenth embodiment of the optical imaging lens according to the present disclosure;

FIGS. 58A and 58B are tables for the values of EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the first to thirteenth example embodiments.

DETAILED DESCRIPTION

Figure 2:
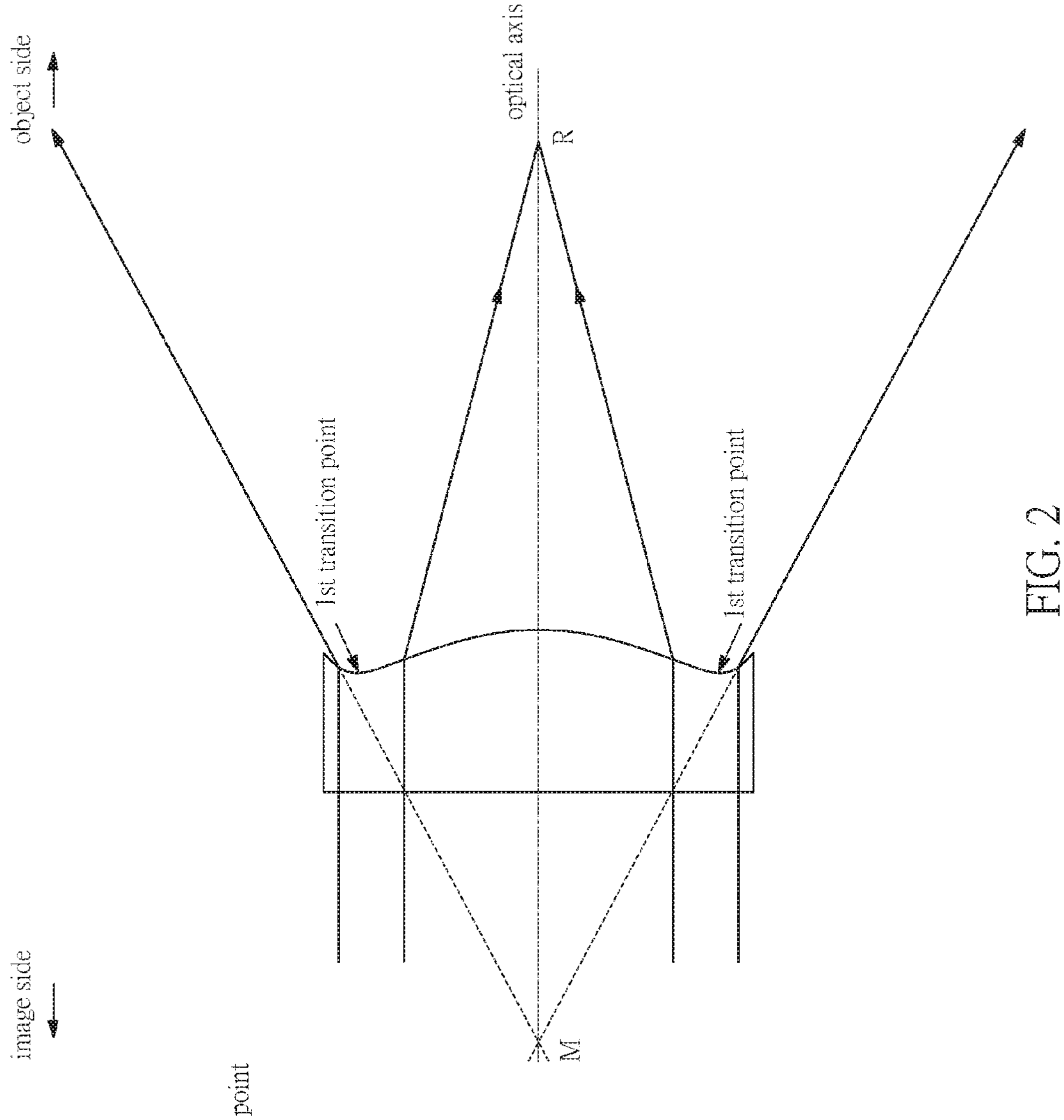
FIG. 2 depicts a schematic view of the relation between the surface shape and the optical focus of the lens element.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refracting power)" means that the paraxial refracting power of the lens element in Gaussian optics is positive (or negative). The description "An object-side (or image-side) surface of a lens element" may include a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element may be rotationally symmetric, where the optical axis I is the axis of symmetry. The region A of the lens element is defined as "a part in a vicinity of the optical axis", and the region C of the lens element is defined as "a part in a vicinity of a periphery of the lens element". Besides, the lens element may also have an extending part E extended radially and outwardly from the region C, namely the part outside of the clear aperture of the lens element. The extending part E may be used for physically assembling the lens element into an optical imaging lens system. Under normal circumstances, the imaging rays would not pass through the extending part E because those imaging rays only pass through the clear aperture. The structures and shapes of the aforementioned extending part E are only examples for technical explanation, the structures and shapes of lens elements should not be limited to these examples. Note that the extending parts of the lens element surfaces depicted in the following embodiments are partially omitted.

The following criteria are provided for determining the shapes and the parts of lens element surfaces set forth in the present specification. These criteria mainly determine the boundaries of parts under various circumstances including the part in a vicinity of the optical axis, the part in a vicinity of a periphery of a lens element surface, and other types of lens element surfaces such as those having multiple parts.

Figure 1:
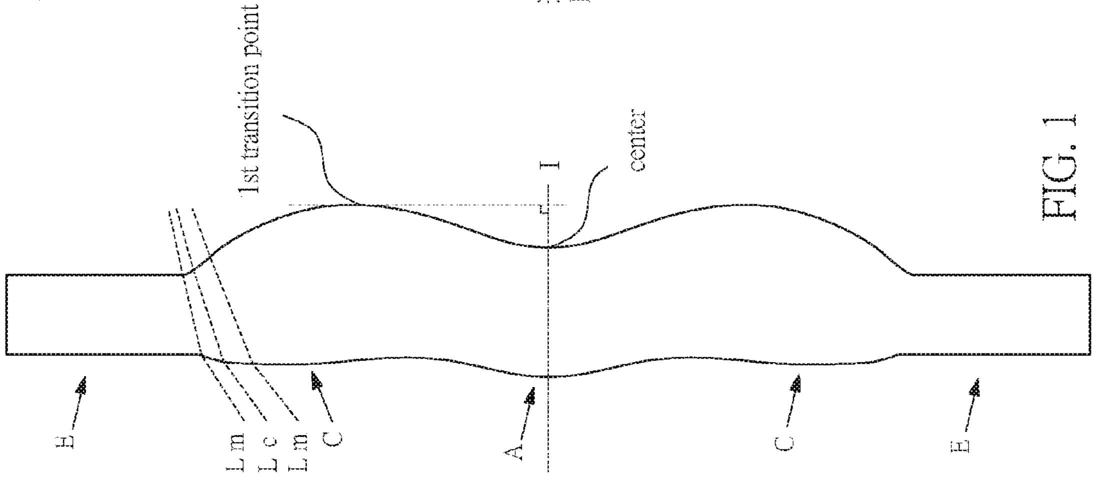
FIG. 1 depicts a cross-sectional view of one single lens element according to the present disclosure.

FIG. 1 depicts a radial cross-sectional view of a lens element. Before determining boundaries of those aforesaid parts, two referential points should be defined first, the central point and the transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The part of a surface of the lens element between the central point and the first transition point is defined as the part in a vicinity of the optical axis. The part located radially outside of the Nth transition point (but still within the scope of the clear aperture) is defined as the part in a vicinity of a periphery of the lens element. In some embodiments, there are other parts existing between the part in a vicinity of the optical axis and the part in a vicinity of a periphery of the lens element; the numbers of parts depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining the shape of a part is convex or concave depends on whether a collimated ray passing through that part converges or diverges. That is, while applying a collimated ray to a part to be determined in terms of shape, the collimated ray passing through that part will be bended and the ray itself or its extension line will eventually meet the optical axis. The shape of that part can be determined by whether the ray or its extension line meets (intersects) the optical axis (focal point) at the object-side or image-side. For instance, if the ray itself intersects the optical axis at the image side of the lens element after passing through a part, i.e. the focal point of this ray is at the image side (see point R in FIG. 2), the part will be determined as having a convex shape. On the contrary, if the ray diverges after passing through a part, the extension line of the ray intersects the optical axis at the object side of the lens element, i.e. the focal point of the ray is at the object side (see point M in FIG. 2), that part will be determined as having a concave shape. Therefore, referring to FIG. 2, the part between the central point and the first transition point may have a convex shape, the part located radially outside of the first transition point may have a concave shape, and the first transition point is the point where the part having a convex shape changes to the part having a concave shape, namely the border of two adjacent parts. Alternatively, there is another method to determine whether a part in a vicinity of the optical axis may have a convex or concave shape by referring to the sign of an "R" value, which is the (paraxial) radius of curvature of a lens surface. The R value may be used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the part in a vicinity of the optical axis may be defined as the part between 0-50% of the effective radius (radius of the clear aperture) of the surface, whereas the part in a vicinity of a periphery of the lens element may be defined as the part between 50-100% of effective radius (radius of the clear aperture) of the surface.

Figure 3:
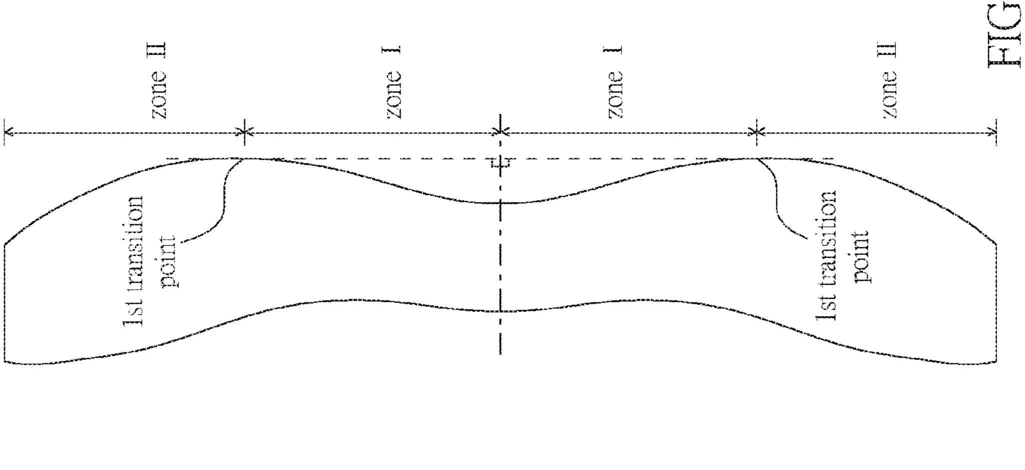
FIG. 3 depicts a schematic view of a first example of the surface shape and the efficient radius of the lens element.

Referring to the first example depicted in FIG. 3, only one transition point, namely a first transition point, appears within the clear aperture of the image-side surface of the lens element. Part I may be a part in a vicinity of the optical axis, and part II may be a part in a vicinity of a periphery of the lens element. The part in a vicinity of the optical axis may be determined as having a concave surface due to the R value at the image-side surface of the lens element is positive. The shape of the part in a vicinity of a periphery of the lens element may be different from that of the radially inner adjacent part, i.e. the shape of the part in a vicinity of a periphery of the lens element may be different from the shape of the part in a vicinity of the optical axis; the part in a vicinity of a periphery of the lens element may have a convex shape.

Figure 4:
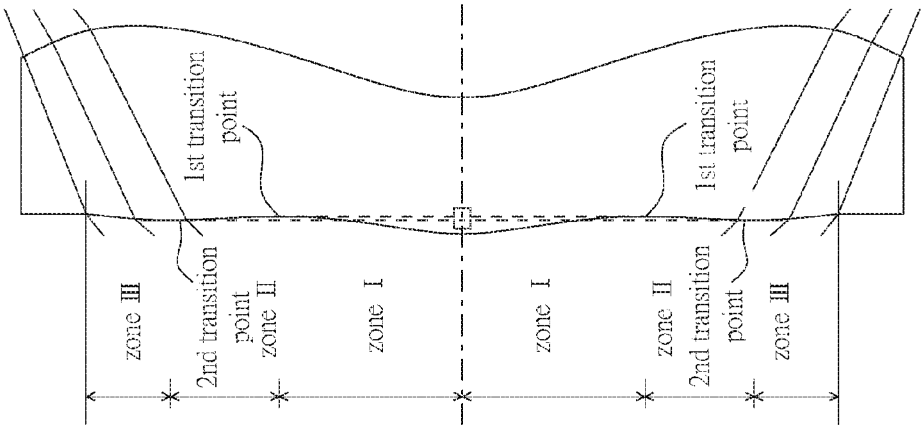
FIG. 4 depicts a schematic view of a second example of the surface shape and the efficient radius of the lens element.

Referring to the second example depicted in FIG. 4, a first transition point and a second transition point may exist on the object-side surface (within the clear aperture) of a lens element. In which part I may be the part in a vicinity of the optical axis, and part III may be the part in a vicinity of a periphery of the lens element. The part in a vicinity of the optical axis may have a convex shape because the R value at the object-side surface of the lens element may be positive. The part in a vicinity of a periphery of the lens element (part III) may have a convex shape. What is more, there may be another part having a concave shape existing between the first and second transition point (part II).

Figure 5:
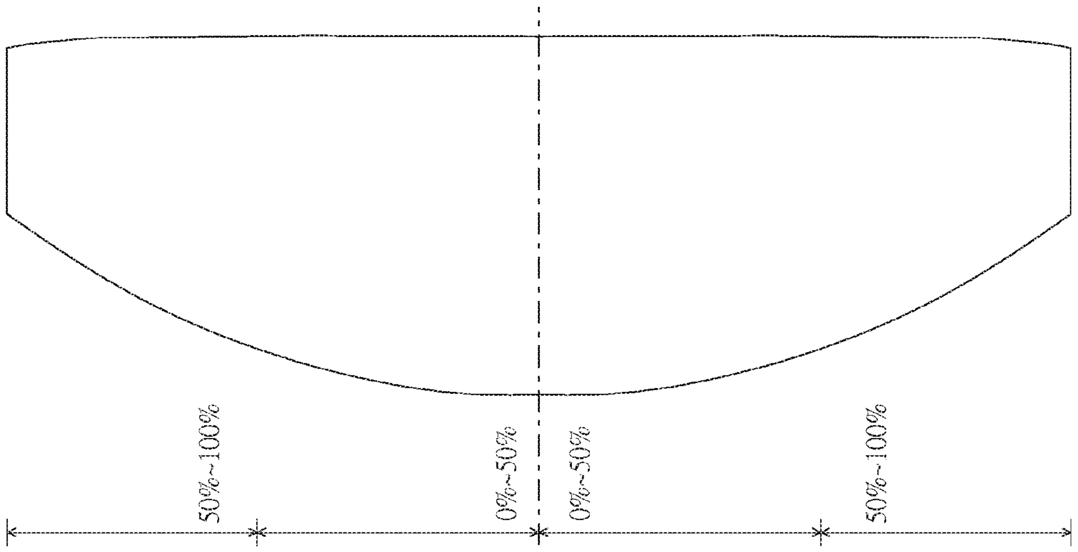
FIG. 5 depicts a schematic view of a third example of the surface shape and the efficient radius of the lens element.

Referring to a third example depicted in FIG. 5, no transition point may exist on the object-side surface of the lens element. In this case, the part between 0-50% of the effective radius (radius of the clear aperture) may be determined as the part in a vicinity of the optical axis, and the part between 50-100% of the effective radius may be determined as the part in a vicinity of a periphery of the lens element. The part in a vicinity of the optical axis of the object-side surface of the lens element may be determined as having a convex shape due to its positive R value, and the part in a vicinity of a periphery of the lens element may be determined as having a convex shape as well.

In some embodiments, the optical imaging lens may further comprise an aperture stop positioned between the object and the first lens element, two adjacent lens elements or the fourth lens element and the image plane, such as glare stop or field stop, which may provide a reduction in stray light that is favorable for improving image quality.

In some embodiments, in the optical imaging lens of the present disclosure, the aperture stop can be positioned between the object and the first lens element as a front aperture stop or between the first lens element and the image plane as a middle aperture stop. If the aperture stop is the front aperture stop, a longer distance between the exit pupil of the optical imaging lens for imaging pickup and the image plane may provide the telecentric effect and may improve the efficiency of receiving images by the image sensor, which may comprise a CCD or CMOS image sensor. If the aperture stop is a middle aperture stop, the view angle of the optical imaging lens may be increased, such that the optical imaging lens for imaging pickup has the advantage of a wide-angle lens.

In the specification, parameters used herein may include:

-continued

| Parameter | Definition |
|---|---|
| TA | The distance between the aperture stop and the object-side surface of the adjacent lens element along the optical axis |
| T1 | The central thickness of the first lens element along the optical axis |
| G12 | The distance between the image-side surface of the first lens element and the object-side surface of the second lens element along the optical axis/The air gap between the first lens element and the second lens element along the optical axis |
| T2 | The central thickness of the second lens element along the optical axis |
| G23 | The air gap between the second lens element and the third lens element along the optical axis |
| T3 | The central thickness of the third lens element along the optical axis |
| G34 | The air gap between the third lens element and the fourth lens element along the optical axis |
| T4 | The central thickness of the fourth lens element along the optical axis |
| G4C | The distance between the image-side surface of the forth lens element and the object-side surface of the cover glass along the optical axis |
| TC | The central thickness of the cover glass along the optical axis |
| GCP | The distance between the image-side surface of the cover glass and an image plane along the optical axis |
| f1 | The focusing length of the first lens element |
| f2 | The focusing length of the second lens element |
| f3 | The focusing length of the third lens element |
| f4 | The focusing length of the fourth lens element |
| n1 | The refracting index of the first lens element |
| n2 | The refracting index of the second lens element |
| n3 | The refracting index of the third lens element |
| n4 | The refracting index of the fourth lens element |
| v1 | The Abbe number of the first lens element |
| v2 | The Abbe number of the second lens element |
| v3 | The Abbe number of the third lens element |
| v4 | The Abbe number of the fourth lens element |
| HFOV | Half Field of View of the optical imaging lens |
| Fno | F-number of the optical imaging lens |
| EFL | The effective focal length of the optical imaging lens |
| TTL | The distance between the object-side surface of the first lens element and an image plane along the optical axis/The length of the optical image lens |
| ALT | The sum of the central thicknesses of all lens elements |
| Gaa | The sum of all air gaps between all lens elements along the optical axis |
| BFL | The back focal length of the optical imaging lens/The distance from the image-side surface of the last lens element to the image plane along the optical axis |
| TL | The distance from the object-side surface of the first lens element to the image-side surface of the lens element adjacent to the image plane along the optical axis |

In the present disclosure, various examples of optical imaging lenses are provided, including examples in which the optical imaging lens is a prime lens. Example embodiments of optical imaging lenses may comprise, sequentially from an object side to an image side along an optical axis, a first, second, third and fourth lens elements and a cover glass, in which each of said lens elements has an object-side surface facing toward the object side and an image-side surface facing toward the image side. The optical imaging lens of the present disclosure achieves good optical characteristics and provides a shortened length due to the design characteristics of each lens element.

According to some embodiments of the optical imaging lens of the present disclosure, the object-side surface of the first lens element may comprise a convex portion in a vicinity of the optical axis; the image-side surface of the first lens element may comprise a concave portion in a vicinity of a periphery of the first lens element; the second lens element may have positive refracting power; the image-side surface of the second lens element may comprise a convex portion in a vicinity of the optical axis; the object-side surface of the third lens element may comprise a convex portion in a vicinity of the optical axis; the object-side surface of the fourth lens element may comprise a concave portion in a vicinity of a periphery of the fourth lens element; the image-side surface of the fourth lens element may comprise a convex portion in a vicinity of a periphery of the fourth lens element; and the optical imaging lens may comprise no other lenses having refracting power beyond the four lens elements. Further, a distance between the object-side surface of the first lens element and an image plane along the optical axis is represented by TTL, a central thickness of the second lens element along the optical axis is represented by T2, an air gap between the third lens element and the fourth lens element along the optical axis is represented by G34, and TTL, T2 and G34 could be controlled to satisfy the equation as follows:

$$TTL/(T2+G34) \leq 4.5 \quad \text{Equation (1).}$$

The optical imaging lens may include variations of any of the above mentioned characteristics, and the system including it may vary one or more lens elements. In addition, the system may include variations of additional optical features as well as variations of the optical lens length of the optical imaging lens. For example, the object-side surface of the first lens element comprising a convex portion in a vicinity of the optical axis and the image-side surface of the first lens element comprising a concave portion in a vicinity of a periphery of the first lens element combined with the second lens element having positive refracting power may favorable to gather light in large angle; the image-side surface of the second lens element comprising a convex portion in a vicinity of the optical axis combined with the object-side surface of the third lens element may comprising a convex portion in a vicinity of the optical axis may favorable to gather light from the first lens element; and the object-side surface of the fourth lens element comprising a concave portion in a vicinity of a periphery of the fourth lens element and the image-side surface of the fourth lens element comprising a convex portion in a vicinity of a periphery of the fourth lens element may favorable to correct aberration derived from the three lens elements front of the fourth lens element. The above mentioned designs may effectively eliminate aberrations, reduce the length of the optical lens, enhance imaging quality, and enlarge the field of view.

Properly decreasing the thicknesses of the lens elements as well as the air gaps between the lens elements serves to shorten the length of the optical imaging lens and enlarge the field of view, which raises image quality. In this manner, the thicknesses of the lens elements and the air gaps between the lens elements may be adjusted to satisfy any one of equations described below, to result in arrangements that overcome the difficulties of providing improved imaging quality while overcoming the previously described difficulties related to assembling the optical lens system:

| | |
|---|---|
| TTL/(T2 + G34) ≤ 4.5 | Equation (1); |
| G12/T2 ≥ 1.3 | Equation (2); |
| TTL/G12 ≤ 5.4 | Equation (3); |
| ALT/(G12 + G34) ≤ 2 | Equation (4); |
| TTL/(G12 + G34) ≤ 4 | Equation (5); |
| ALT/G12 ≤ 2.6 | Equation (6); |
| (T2 + T3)/G34 ≤ 5 | Equation (7); |
| (G12 + T3)/T2 ≥ 2.3 | Equation (8); |
| Gaa/T2 ≥ 2.2 | Equation (9); |
| TL/(G12 + G34) ≤ 3.2 | Equation (10); |
| (G12 + G34)/T2 ≥ 1.9 | Equation (11); |
| T3/G34 ≤ 2.5 | Equation (12); |
| (T2 + G23)/G34 ≤ 3.5 | Equation (13); |
| ALT/G34 ≤ 6.9 | Equation (14); |
| TTL/G34 ≤ 13.7 | Equation (15); |
| TL/G34 ≤ 11 | Equation (16); |
| (T2 + T1)/G34 ≤ 3.5 | Equation (17); |

-continued

| | |
|---|---|
| (T4 + T2)/G34 ≤ 3.5 | Equation (18); and |
| (T4 + T3)/G34 ≤ 3.2 | Equation (20). |

In some embodiments, the value of TTL/(T2+G34) may be further restricted between 2.50 and 4.50. In some embodiments, the value of G12/T2 may be further restricted between 1.30 and 4.00. In some embodiments, the value of TTL/G12 may be further restricted between 2.50 and 5.40. In some embodiments, the value of ALT/(G12+G34) may be further restricted between 0.50 and 2.00. In some embodiments, the value of TTL/(G12+G34) may be further restricted between 1.50 and 4.00. In some embodiments, the value of ALT/G12 may be further restricted between 0.50 and 2.60. In some embodiments, the value of (T2+T3)/G34 may be further restricted between 1.00 and 5.00. In some embodiments, the value of (G12+T3)/T2 may be further restricted between 2.30 and 5.00. In some embodiments, the value of Gaa/T2 may be further restricted between 2.20 and 5.50. In some embodiments, the value of TL/(G12+G34) may be further restricted between 1.50 and 3.20. In some embodiments, the value of (G12+G34)/T2 may be further restricted between 1.90 and 5.00. In some embodiments, the value of T3/G34 may be further restricted between 0.30 and 2.50. In some embodiments, the value of (T2+G23)/G34 may be further restricted between 0.50 and 3.50. In some embodiments, the value of ALT/G34 may be further restricted between 1.50 and 6.90. In some embodiments, the value of TTL/G34 may be further restricted between 4.50 and 13.70. In some embodiments, the value of TL/G34 may be further restricted between 4.00 and 11.00. In some embodiments, the value of (T2+T1)/G34 may be further restricted between 0.50 and 3.50. In some embodiments, the value of (T4+T2)/G34 may be further restricted between 0.50 and 3.50. In some embodiments, the value of (T4+T3)/G34 may be further restricted between 0.50 and 3.20.

Shortening EFL may enlarge the field of view, so that EFL should be shortened as small as possible. In view of the above, satisfying the following equation may result in decreasing the thickness of the system. Furthermore, the field of view may be enlarged:

$$EFL/G34 \leq 2.6 \quad \text{Equation (19).}$$

In some embodiments, the value of EFL/G34 may be further restricted between 1.00 and 2.60. As a result of restricting various values as described above, the imaging quality of the optical imaging lens may be improved.

It should be appreciated that numerous variations are possible when considering improvements to the design of an optical system. When the optical imaging lens of the present disclosure satisfies at least one of the equations described above, the length of the optical lens may be reduced, the aperture stop may be enlarged (F-number may be reduced), the field angle may be enlarged, the imaging quality may be enhanced, or the assembly yield may be upgraded. Such characteristics may advantageously mitigate various drawbacks in other optical system designs.

When implementing example embodiments, more details about the convex or concave surface could be incorporated for one specific lens element or broadly for plural lens elements to enhance the control for the system performance and/or resolution. It is noted that the details listed here could be incorporated in example embodiments if no inconsistency occurs.

Figure 6:
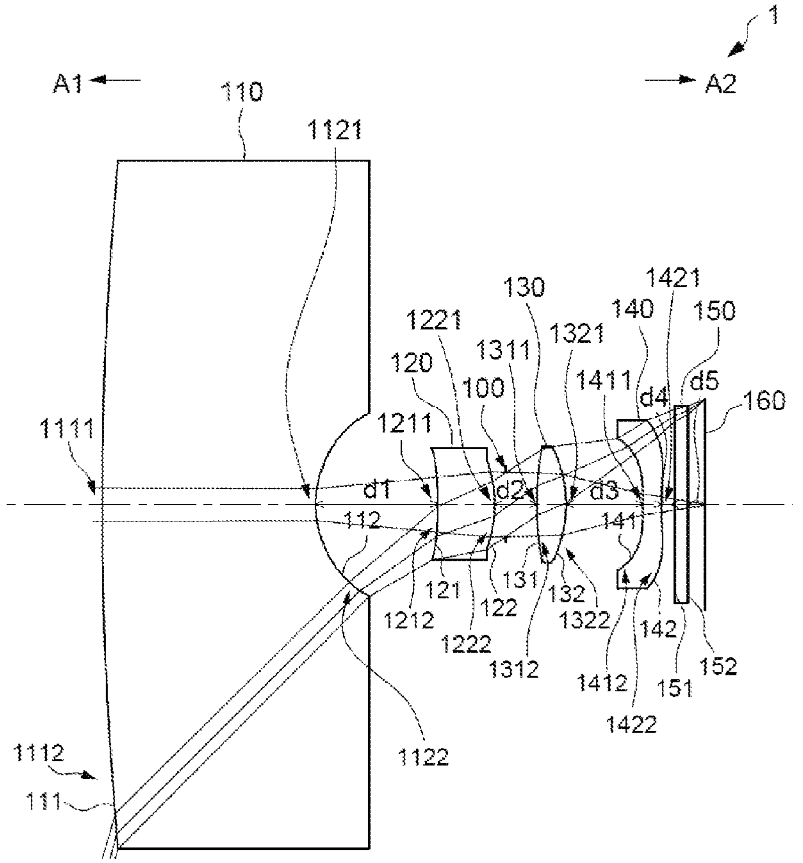
FIG. 6 depicts a cross-sectional view of a first embodiment of an optical imaging lens having four lens elements according to the present disclosure.
Figure 7:
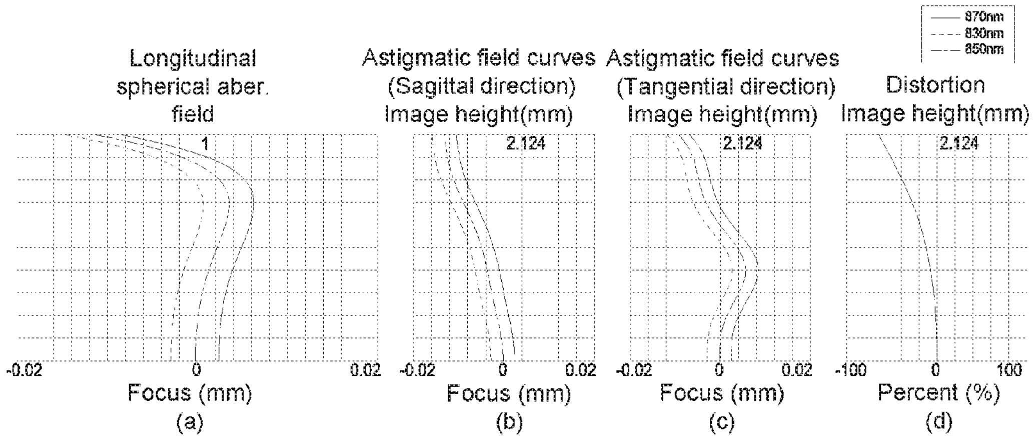
FIG. 7 depicts a chart of longitudinal spherical aberration and other kinds of optical aberrations of a first embodiment of the optical imaging lens according to the present disclosure.

Several exemplary embodiments and associated optical data will now be provided to illustrate non-limiting examples of optical imaging lens systems having good optical characteristics and a shortened length. Reference is now made to FIGS. 6-9. FIG. 6 illustrates an example cross-sectional view of an optical imaging lens 1 having four lens elements according to a first example embodiment. FIG. 7 shows example charts of longitudinal spherical aberration and other kinds of optical aberrations of the optical imaging lens 1 according to the first example embodiment. FIG. 8 illustrates an example table of optical data of each lens element of the optical imaging lens 1 according to the first example embodiment. FIG. 9 depicts an example table of aspherical data of the optical imaging lens 1 according to the first example embodiment.

As shown in FIG. 6, the optical imaging lens 1 of the present embodiment may comprise, in order from an object side A1 to an image side A2 along an optical axis, a first lens element 110, a second lens element 120, an aperture stop 100, a third lens element 130 and a fourth lens element 140. A cover glass 150 and an image plane 160 of an image sensor (not shown) are positioned at the image side A2 of the optical imaging lens 1. Each of the first, second, third, fourth lens elements 110, 120, 130, 140 and the cover glass 150 may comprise an object-side surface 111/121/131/141/151 facing toward the object side A1 and an image-side surface 112/122/132/142/152 facing toward the image side A2.

Exemplary embodiments of each lens element of the optical imaging lens 1 will now be described with reference to the drawings.

An example embodiment of the first lens element 110 may have negative refracting power. The object-side surface 111 may comprise a convex portion 1111 in a vicinity of an optical axis and a convex portion 1112 in a vicinity of a periphery of the first lens element 110. The image-side surface 112 may comprise a concave portion 1121 in a vicinity of the optical axis and a concave portion 1122 in a vicinity of a periphery of the first lens element 110. The object-side surface 111 may be spherical surface and the image-side surface 112 may be aspherical surface. The material of the first lens element 110 may be plastic.

An example embodiment of the second lens element 120 may have positive refracting power. The object-side surface 121 may comprise a concave portion 1211 in a vicinity of the optical axis and a concave portion 1212 in a vicinity of a periphery of the second lens element 120. The image-side surface 122 may comprise a convex portion 1221 in a vicinity of the optical axis and a convex portion 1222 in a vicinity of a periphery of the second lens element 120. The object-side surface 121 and the image-side surface 122 may be aspherical surfaces. The material of the second lens element 120 may be plastic.

An example embodiment of the third lens element 130 may have positive refracting power. The object-side surface 131 may comprise a convex portion 1311 in a vicinity of the optical axis and a convex portion 1312 in a vicinity of a periphery of the third lens element 130. The image-side surface 132 may comprise a convex portion 1321 in a vicinity of the optical axis and a convex portion 1322 in a vicinity of a periphery of the third lens element 130. The object-side surface 131 and the image-side surface 132 may be spherical surfaces. The material of the third lens element 130 may be glass.

An example embodiment of the fourth lens element 140 may have negative refracting power. The object-side surface 141 may comprise a concave portion 1411 in a vicinity of the optical axis and a concave portion 1412 in a vicinity of a periphery of the fourth lens element 140. The image-side surface 142 may comprise a concave portion 1421 in a vicinity of the optical axis and a convex portion 1422 in a vicinity of a periphery of the fourth lens element 140. The object-side surface 141 and the image-side surface 142 may be aspherical surfaces. The material of the fourth lens element 140 may be plastic.

In example embodiments, air gaps exist between the lens elements 110, 120, 130, 140, the cover glass 150 and the image plane 160 of the image sensor. For example, FIG. 6 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the cover glass 150, and the air gap d5 existing between the cover glass 150 and the image plane 160. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, the air gap d4 is denoted by G4C, the air gap d5 is denoted by GCP, and the sum of d1, d2 and d3 is denoted by Gaa.

FIG. 8 depicts the optical characteristics of each lens elements in the optical imaging lens 1 of the present embodiment. The aspherical surfaces including the image-side surface 112 of the first lens element 110, the object-side surface 121 and the image-side surface 122 of the second lens element 120, and the object-side surface 141 and the image-side surface 142 of the fourth lens element 140 are all defined by the following aspherical formula (1):

$$Z(Y) = \frac{Y^2}{R} \Bigg/ \left(1 + \sqrt{1 - (1+K)\frac{Y^2}{R^2}}\right) + \sum_{i=1}^{n} a_{2i} \times Y^{2i} \qquad \text{formula (1)}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 9.

FIG. 7 part (a) shows the longitudinal spherical aberration, wherein the horizontal axis of FIG. 7 part (a) defines the focus, and the vertical axis of FIG. 7 part (a) defines the field of view. FIG. 7 part (b) shows the astigmatism aberration in the sagittal direction, wherein the horizontal axis of FIG. 7 part (b) defines the focus, and the vertical axis of FIG. 7 part (b) defines the image height. FIG. 7 part (c) shows the astigmatism aberration in the tangential direction, wherein the horizontal axis of FIG. 7 part (c) defines the focus, and the vertical axis of FIG. 7 part (c) defines the image height. FIG. 7 part (d) shows the variation of the distortion aberration, wherein the horizontal axis of FIG. 7 part (d) defines the percentage, and the vertical axis of FIG. 7 part (d) defines the image height. The three curves with different wavelengths (830 nm, 850 nm and 870 nm) represent that off-axis light with respect to these wavelengths may be focused around an image point. From the vertical deviation of each curve shown in FIG. 7 part (a), the offset of the off-axis light relative to the image point may be within about ±0.016 mm. Therefore, the first embodiment may improve the longitudinal spherical aberration with respect to different wavelengths. Referring to FIG. 7 part (b), the focus variation with respect to the three different wavelengths (830 nm, 850 nm and 870 nm) in the whole field may fall within about ±0.016 mm. Referring to FIG. 7 part (c), the focus variation with respect to the three different wavelengths (830 nm, 850 nm and 870 nm) in the whole field may fall within about ±0.012 mm. Referring to FIG. 7 part (d), the horizontal axis of FIG. 7 part (d), the variation of the distortion aberration may be within about ±70%.

Please refer to FIG. 58A for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 111 of the first lens element 110 to the image plane 160 along the optical axis may be about 13.303 mm, EFL may be about 1.832 mm, HFOV may be about 73.043 degrees, the image height may be about 2.124 mm, and Fno may be about 2.745. In accordance with these values, the present embodiment may provide an optical imaging lens having a shortened length, and may be capable of accommodating a slim product profile that also renders improved optical performance.

Figure 10:
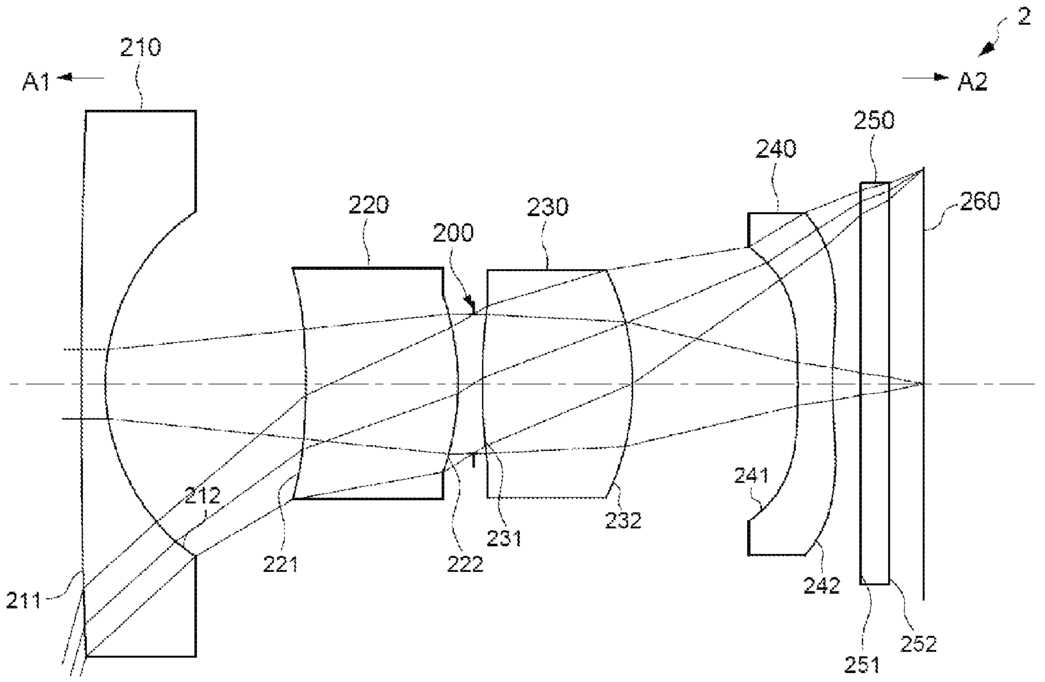
FIG. 10 depicts a cross-sectional view of a second embodiment of an optical imaging lens having four lens elements according to the present disclosure.
Figure 11:
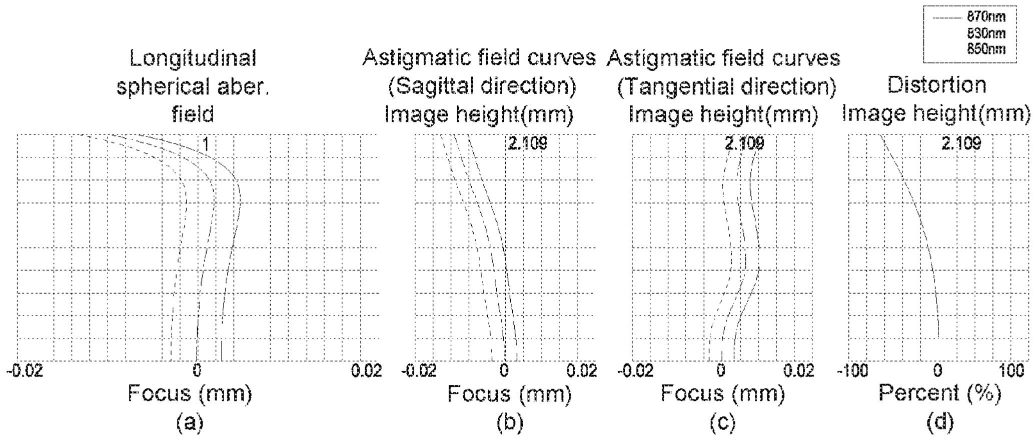
FIG. 11 depicts a chart of longitudinal spherical aberration and other kinds of optical aberrations of a second embodiment of the optical imaging lens according the present disclosure.

Reference is now made to FIGS. 10-13. FIG. 10 illustrates an example cross-sectional view of an optical imaging lens 2 having four lens elements according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise a first lens element 210, a second lens element 220, an aperture stop 200, a third lens element 230 and a fourth lens element 240.

The arrangement of the convex or concave surface structures, including the object-side surfaces 211, 221, 231, and 241 and the image-side surfaces 212, 222, 232, and 242 are generally similar to the optical imaging lens 1. The differences between the optical imaging lens 1 and the optical imaging lens 2 may include a radius of curvature, a thickness, aspherical data, and an effective focal length of each lens element.

Here, for clearly showing the drawings of the present embodiment, only the surface shapes which are different from that in the first embodiment are labeled. Please refer to FIG. 12 for the optical characteristics of each lens element in the optical imaging lens 2 of the present embodiment.

From the vertical deviation of each curve shown in FIG. 11 part (a), the offset of the off-axis light relative to the image point may be within about ±0.014 mm. Referring to FIG. 11 part (b), the focus variation with respect to the three different wavelengths (830 nm, 850 nm and 870 nm) in the whole field may fall within about ±0.016 mm. Referring to FIG. 11 part (c), the focus variation with respect to the three different wavelengths (830 nm, 850 nm and 870 nm) in the whole field may fall within about ±0.01 mm. Referring to FIG. 11 part (d), the variation of the distortion aberration of the optical imaging lens 2 may be within about ±70%.

Please refer to FIG. 58A for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 211 of the first lens element 210 to the image plane 260 along the optical axis may be about 9.02 mm, EFL may be about 1.859 mm, the image height may be about 2.109 mm, HFOV may be about 73.043 degrees, and Fno may be about 2.742.

In comparison with the first embodiment, the longitudinal spherical aberration, the astigmatism aberration in the tangential direction, TTL and Fno in the second embodiment may be smaller. Further, the second embodiment may be manufactured more easily and the yield rate may be higher.

Figure 14:
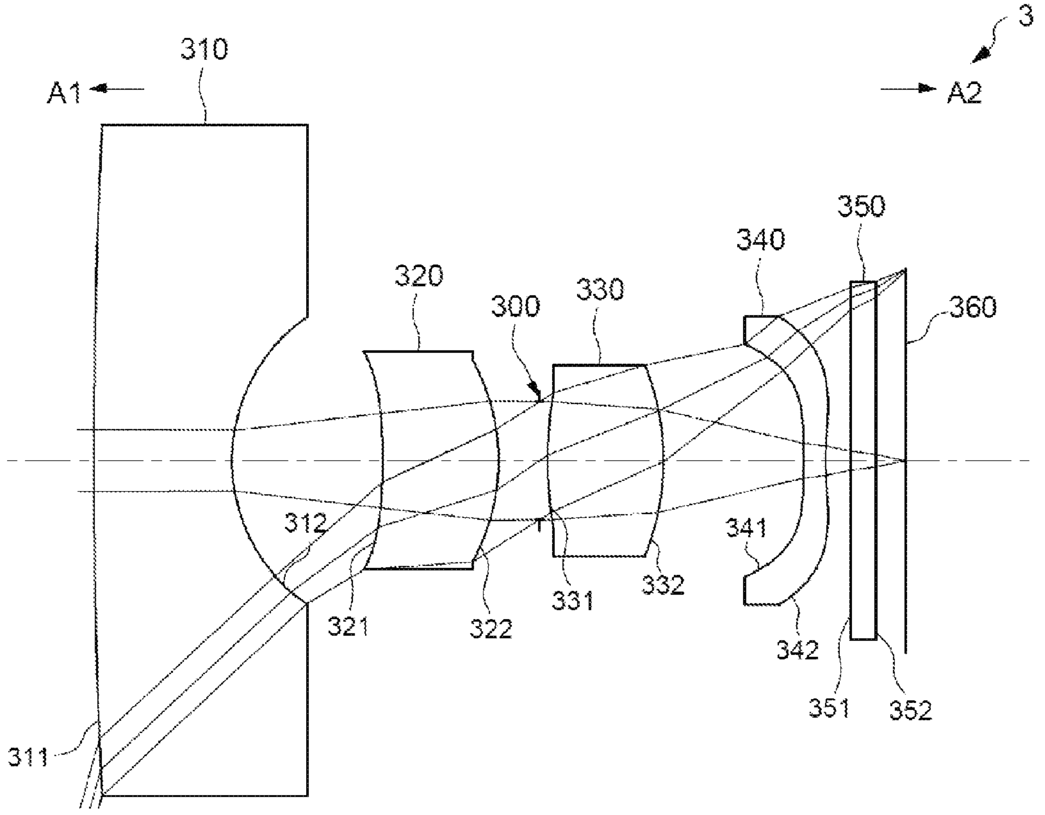
FIG. 14 depicts a cross-sectional view of a third embodiment of an optical imaging lens having four lens elements according to the present disclosure.
Figure 15:
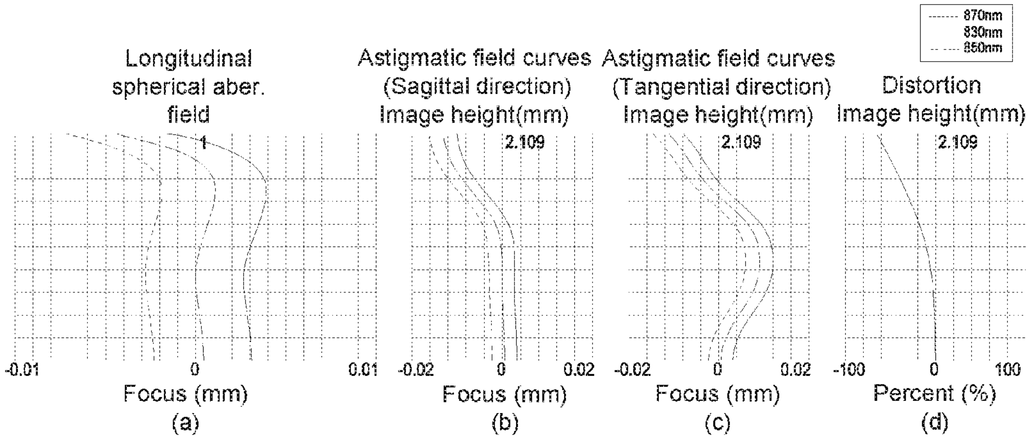
FIG. 15 depicts a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having four lens elements according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise a first lens element 310, a second lens element 320, an aperture stop 300, a third lens element 330 and a fourth lens element 340.

The arrangement of the convex or concave surface structures, including the object-side surfaces 311, 321, 331, and 341 and the image-side surfaces 312, 322, 332, and 342 are generally similar to the optical imaging lens 1. The differences between the optical imaging lens 1 and the optical imaging lens 3 may include a radius of curvature, a thickness, aspherical data, and an effective focal length of each lens element.

Here, for clearly showing the drawings of the present embodiment, only the surface shapes which are different from that in the first embodiment are labeled. Please refer to FIG. 16 for the optical characteristics of each lens element in the optical imaging lens 3 of the present embodiment.

From the vertical deviation of each curve shown in FIG. 15 part (a), the offset of the off-axis light relative to the image point may be within about ±0.008 mm. Referring to FIG. 15 part (b), the focus variation with respect to the three different wavelengths (830 nm, 850 nm and 870 nm) in the whole field may fall within about ±0.02 mm. Referring to FIG. 15 part (c), the focus variation with respect to the three different wavelengths (830 nm, 850 nm and 870 nm) in the whole field may fall within about ±0.015 mm. Referring to FIG. 15 part (d), the variation of the distortion aberration of the optical imaging lens 3 may be within about ±70%.

Please refer to FIG. 58A for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 311 of the first lens element 310 to the image plane 360 along the optical axis may be about 9.754 mm, EFL may be about 1.867 mm, the image height may be about 2.109 mm, HFOV may be about 73.043 degrees, and Fno may be about 2.756.

In comparison with the first embodiment, the longitudinal spherical aberration and TTL of the third embodiment may be smaller. Furthermore, the third embodiment of the optical imaging lens may be manufactured more easily and its yield rate may be higher.

Figure 18:
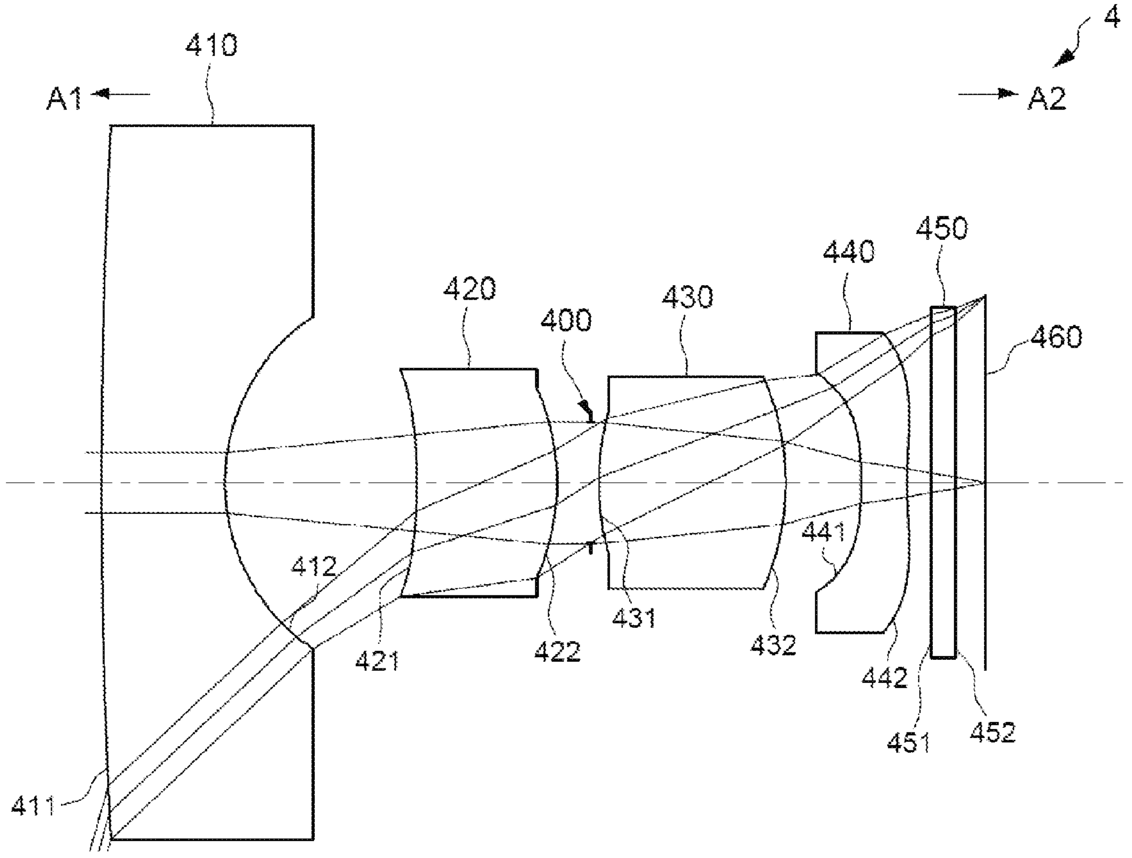
FIG. 18 depicts a cross-sectional view of a fourth embodiment of an optical imaging lens having four lens elements according to the present disclosure.
Figure 19:
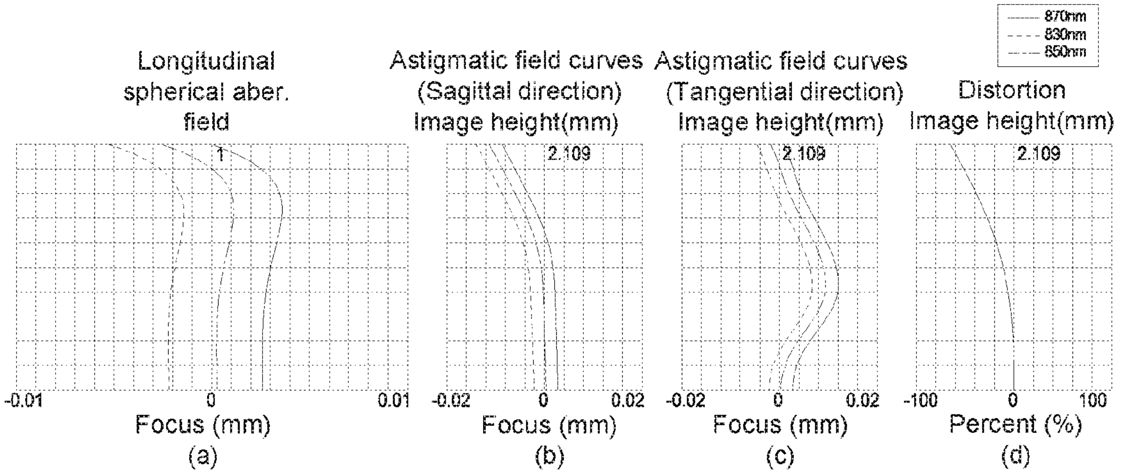
FIG. 19 depicts a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having four lens elements according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise a first lens element 410, a second lens element 420, an aperture stop 400, a third lens element 430 and a fourth lens element 440.

The arrangement of the convex or concave surface structures, including the object-side surfaces 411, 421, 431, and 441 and the image-side surfaces 412, 422, 432, and 442 are generally similar to the optical imaging lens 1. The differences between the optical imaging lens 1 and the optical imaging lens 4 may include a radius of curvature, a thickness, aspherical data, and an effective focal length of each lens element.

Here, for clearly showing the drawings of the present embodiment, only the surface shapes which are different from that in the first embodiment are labeled. Please refer to FIG. 20 for the optical characteristics of each lens elements in the optical imaging lens 4 of the present embodiment.

From the vertical deviation of each curve shown in FIG. 19 part (a), the offset of the off-axis light relative to the image point may be within about ±0.006 mm. Referring to FIG. 19 part (b), the focus variation with respect to the three different wavelengths (830 nm, 850 nm and 870 nm) in the whole field may fall within about ±0.016 mm. Referring to FIG. 19 part (c), the focus variation with respect to the three different wavelengths (830 nm, 850 nm and 870 nm) in the whole field may fall within about ±0.012 mm. Referring to FIG. 19 part (d), the variation of the distortion aberration of the optical imaging lens 4 may be within about ±70%.

Please refer to FIG. 58A for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 411 of the first lens element 410 to the image plane 460 along the optical axis may be about 10.895 mm, EFL may be about 1.865 mm, the image height may be about 2.109 mm, HFOV may be about 73.030 degrees, and Fno may be about 2.734.

Comparing with the first embodiment, the longitudinal spherical aberration and Fno of the fourth embodiment may be smaller, and TTL of the fourth embodiment may be shorter. Furthermore, the fourth embodiment of the optical imaging lens may be manufactured more easily and its yield rate may be higher.

Figure 22:
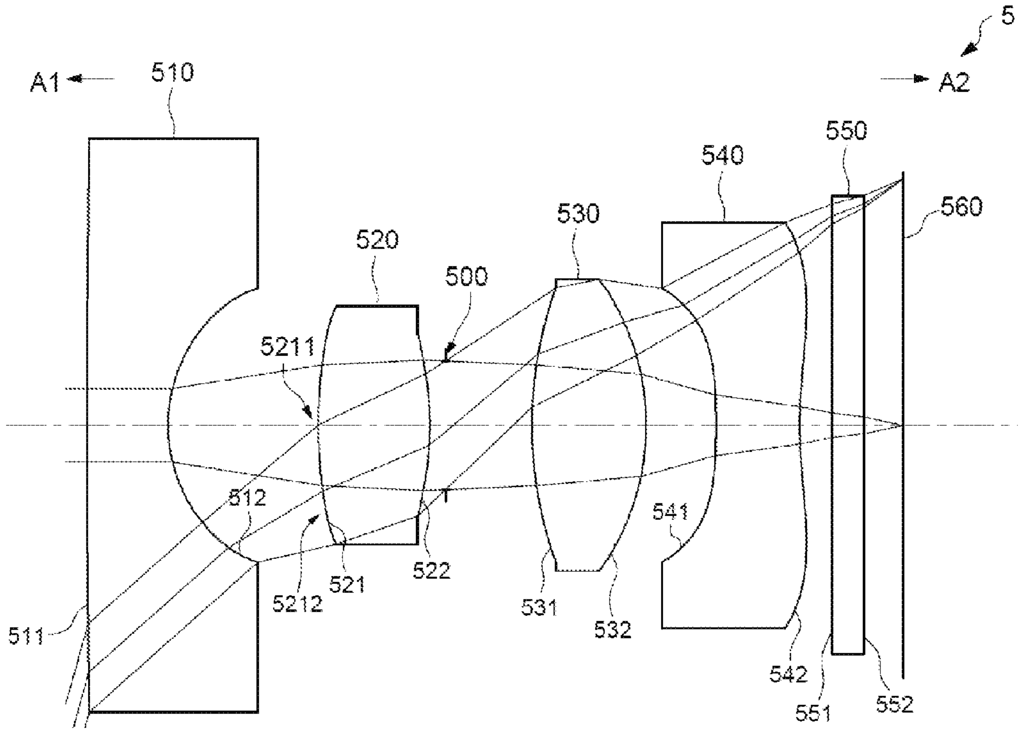
FIG. 22 depicts a cross-sectional view of a fifth embodiment of an optical imaging lens having four lens elements according to the present disclosure.
Figure 23:
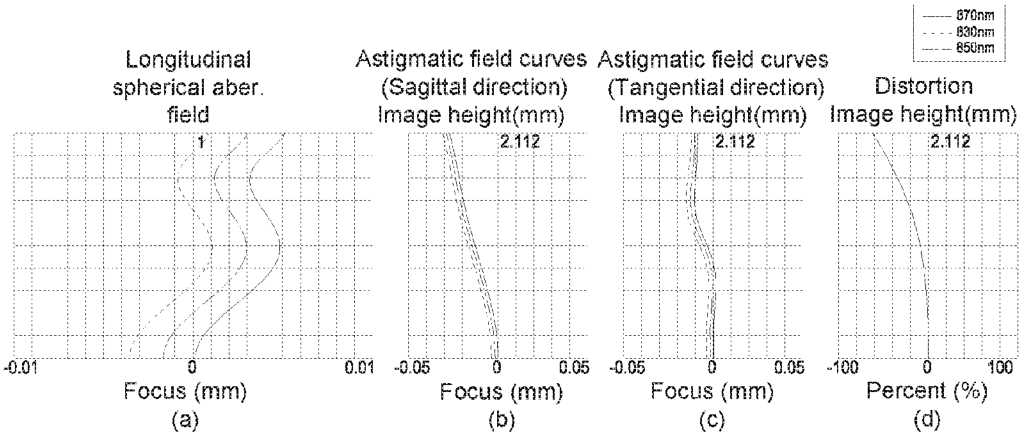
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having four lens elements according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise a first lens element 510, a second lens element 520, an aperture stop 500, a third lens element 530 and a fourth lens element 540.

The arrangement of the convex or concave surface structures, including the object-side surfaces 511, 431, and 541 and the image-side surfaces 512, 522, 532, and 542 are generally similar to the optical imaging lens 1. The differences between the optical imaging lens 1 and the optical imaging lens 5 may include the concave/convex shapes of the object-side surface 521, the radius of curvature, the thickness, aspherical data, and the effective focal length of each lens element. More specifically, the object-side surface 521 may comprise a convex portion 5211 in a vicinity of the optical axis and a convex portion 5212 in a vicinity of a periphery of the second lens element 520.

Here, for clearly showing the drawings of the present embodiment, only the surface shapes which are different from that in the first embodiment are labeled. FIG. 24 depicts the optical characteristics of each lens elements in the optical imaging lens 5 of the present embodiment.

From the vertical deviation of each curve shown in FIG. 23 part (a), the offset of the off-axis light relative to the image point may be within about ±0.006 mm. Referring to FIG. 23 part (b), the focus variation with respect to the three different wavelengths (830 nm, 850 nm and 870 nm) in the whole field may fall within about ±0.014 mm. Referring to FIG. 23 part (c), the focus variation with respect to the three different wavelengths (830 nm, 850 nm and 870 nm) in the whole field may fall within about ±0.008 mm. Referring to FIG. 23 part (d), the variation of the distortion aberration of the optical imaging lens 5 may be within about ±70%.

Please refer to FIG. 58A for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 511 of the first lens element 510 to the image plane 560 along the optical axis may be about 7.647 mm, EFL may be about 1.721 mm, the image height may be about 2.112 mm, HFOV may be about 73.027 degrees, and Fno may be about 2.750.

In comparison with the first embodiment, the longitudinal spherical aberration, the astigmatism aberration in the sagittal and tangential directions, TTL and EFL of the fifth embodiment may be smaller. Furthermore, the fifth embodiment of the optical imaging lens may be manufactured more easily and the yield rate may be higher.

Figure 26:
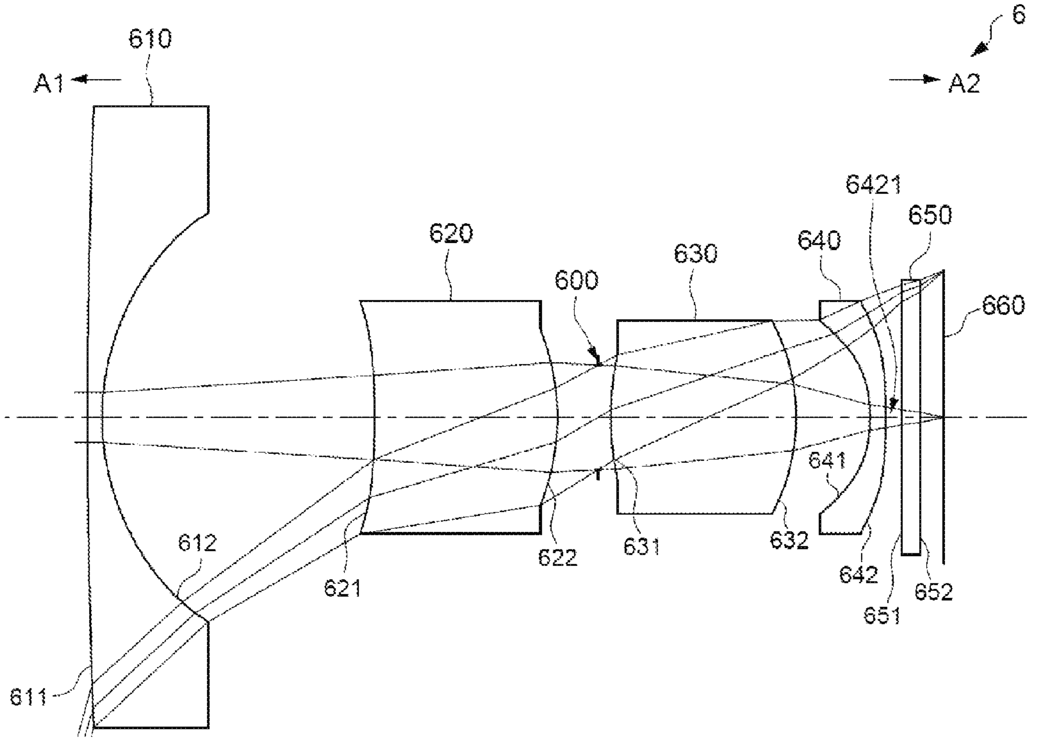
FIG. 26 depicts a cross-sectional view of a sixth embodiment of an optical imaging lens having four lens elements according to the present disclosure.
Figure 27:
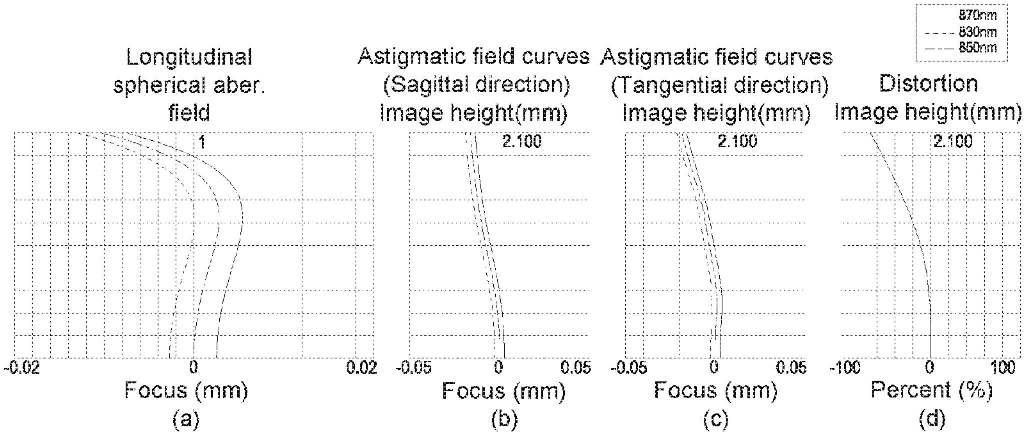
FIG. 27 depicts a chart of longitudinal spherical aberration and other kinds of optical aberrations of a sixth embodiment of the optical imaging lens according to the present disclosure.

Reference is now made to FIGS. 26-29. FIG. 26 illustrates an example cross-sectional view of an optical imaging lens 6 having four lens elements according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise a first lens element 610, a second lens element 620, an aperture stop 600, a third lens element 630 and a fourth lens element 640.

The arrangement of the convex or concave surface structures, including the object-side surfaces 611, 621, 631 and 641 and the image-side surfaces 612, 622, and 632 are generally similar to the optical imaging lens 1. The differences between the optical imaging lens 1 and the optical imaging lens 6 may include the concave/convex shapes of the image-side surface 642, a radius of curvature, a thickness, aspherical data, and an effective focal length of each lens element. More specifically, the image-side surface 642 may comprise a convex portion 6421 in a vicinity of the optical axis.

Here, for clearly showing the drawings of the present embodiment, only the surface shapes which are different from that in the first embodiment are labeled. Please refer to FIG. 28 for the optical characteristics of each lens elements in the optical imaging lens 6 of the present embodiment.

From the vertical deviation of each curve shown in FIG. 27 part (a), the offset of the off-axis light relative to the image point may be within about ±0.014 mm. Referring to FIG. 27 part (b), the focus variation with respect to the three different wavelengths (830 nm, 850 nm and 870 nm) in the whole field may fall within about ±0.02 mm. Referring to FIG. 23 part (c), the focus variation with respect to the three different wavelengths (830 nm, 850 nm and 870 nm) in the whole field may fall within about ±0.02 mm. Referring to FIG. 27 part (d), the variation of the distortion aberration of the optical imaging lens 6 may be within about ±70%.

Please refer to FIG. 58A for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 611 of the first lens element 610 to the image plane 660 along the optical axis may be about 13.355 mm, EFL may be about 1.953 mm, the image height may be about 2.100 mm, HFOV may be about 73.049 degrees, and Fno may be about 2.715.

In comparison with the first embodiment, the longitudinal spherical aberration, Fno of the sixth embodiment may be smaller, and HFOV of the sixth embodiment may be larger. Furthermore, the sixth embodiment of the optical imaging lens may be manufactured more easily and the yield rate may be higher.

Figure 30:
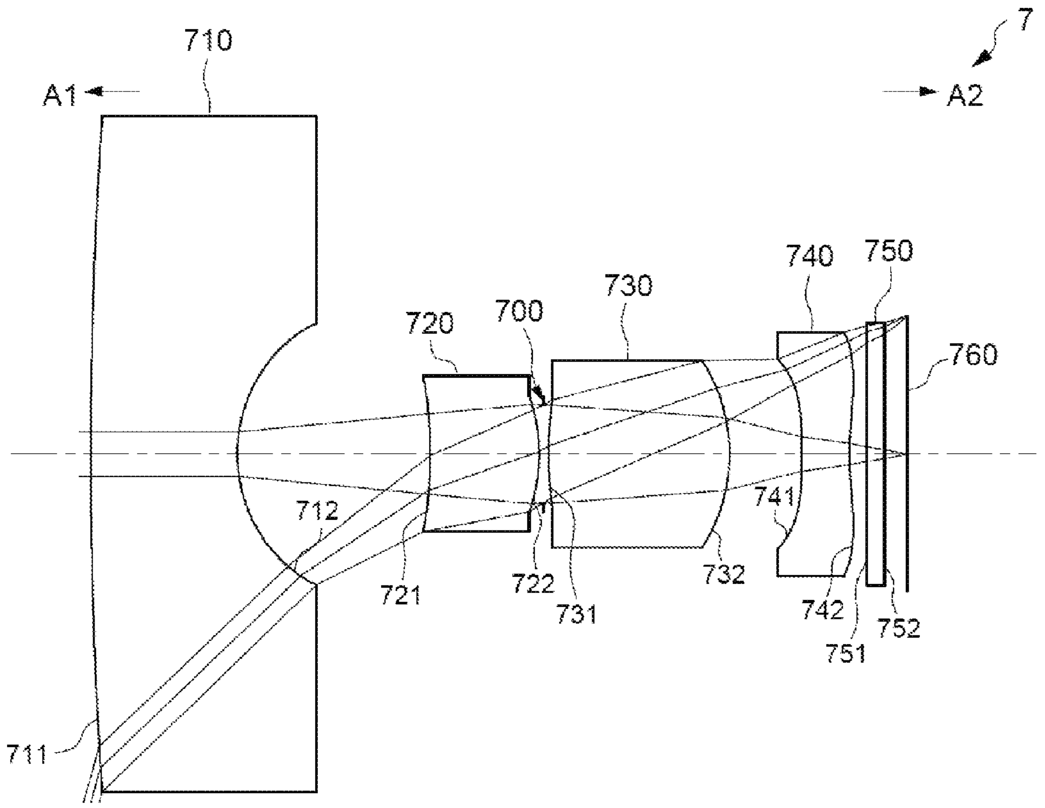
FIG. 30 depicts a cross-sectional view of a seventh embodiment of an optical imaging lens having four lens elements according to the present disclosure.
Figure 31:
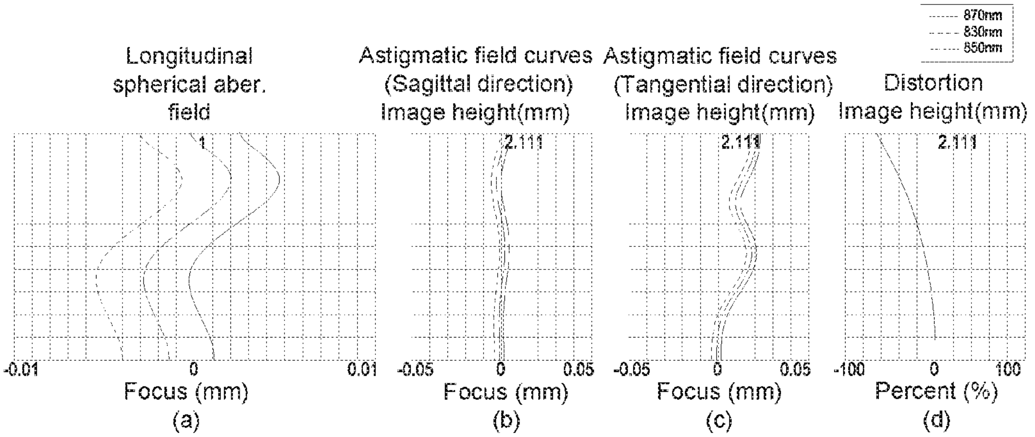
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having four lens elements according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise a first lens element 710, a second lens element 720, an aperture stop 700, a third lens element 730 and a fourth lens element 740.

The arrangement of the convex or concave surface structures, including the object-side surfaces 711, 721, 731, and 741 and the image-side surfaces 712, 722, 732, and 742 are generally similar to the optical imaging lens 1. The differences between the optical imaging lens 1 and the optical imaging lens 7 may include a radius of curvature, a thickness, aspherical data, and an effective focal length of each lens element.

Here, for clearly showing the drawings of the present embodiment, only the surface shapes which are different from that in the first embodiment are labeled. Please refer to FIG. 32 for the optical characteristics of each lens elements in the optical imaging lens 7 of the present embodiment.

From the vertical deviation of each curve shown in FIG. 31 part (a), the offset of the off-axis light relative to the image point may be within ±0.006 mm. Referring to FIG. 31 part (b), the focus variation with respect to the three different wavelengths (830 nm, 850 nm and 870 nm) in the whole field falls within ±0.01 mm. Referring to FIG. 31 part (c), the focus variation with respect to the three different wavelengths (830 nm, 850 nm and 870 nm) in the whole field falls within ±0.02 mm. Referring to FIG. 31 part (d), the variation of the distortion aberration of the optical imaging lens 7 may be within ±70%.

Please refer to FIG. 58B for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 711 of the first lens element 710 to the image plane 760 along the optical axis may be about 13.609 mm, EFL may be about 1.863 mm, the image height may be about 2.111 mm, HFOV may be about 73.069 degrees, and Fno may be about 2.716.

In comparison with the first embodiment, the longitudinal spherical aberration and the astigmatism aberration in the sagittal direction of the seventh embodiment may be smaller, Fno of the seventh embodiment may be smaller, and HFOV of the seventh embodiment may be larger. Furthermore, the seventh embodiment of the optical imaging lens may be manufactured more easily and the yield rate may be higher.

Figure 34:
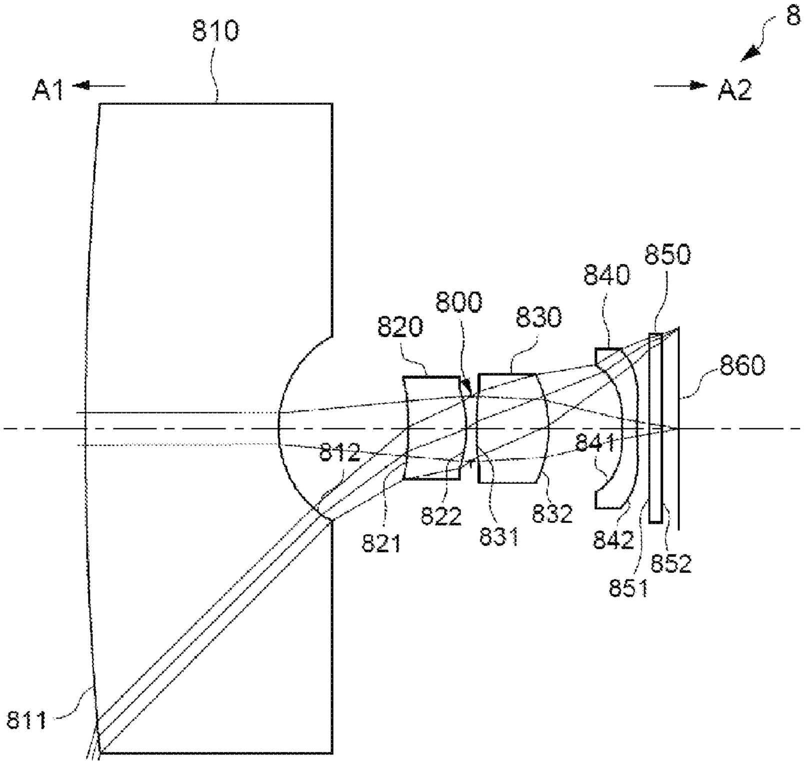
FIG. 34 depicts a cross-sectional view of an eighth embodiment of an optical imaging lens having four lens elements according to the present disclosure.
Figure 35:
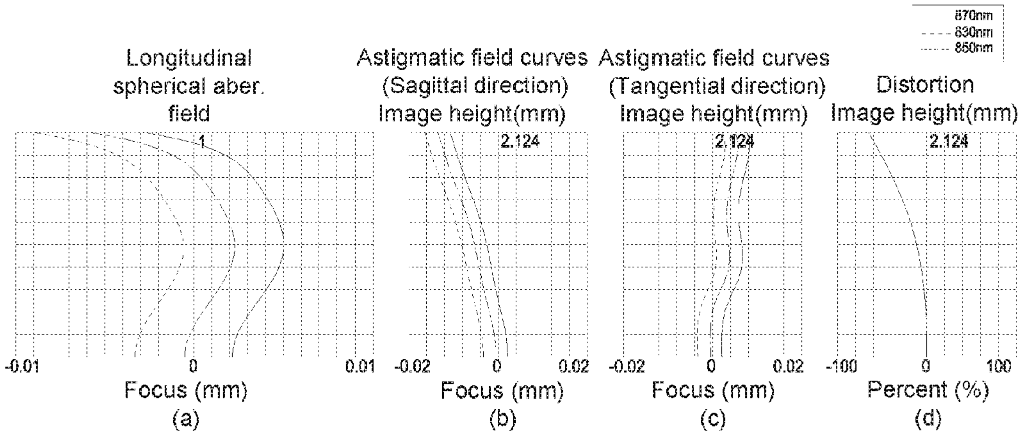
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having four lens elements according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise a first lens element 810, a second lens element 820, an aperture stop 800, a third lens element 830 and a fourth lens element 840.

The arrangement of the convex or concave surface structures, including the object-side surfaces 811, 821, 831, and 841 and the image-side surfaces 812, 822, 832 and 842 are generally similar to the optical imaging lens 1. The differences between the optical imaging lens 1 and the optical imaging lens 8 may include a radius of curvature, a thickness, aspherical data, and an effective focal length of each lens element.

Here, for clearly showing the drawings of the present embodiment, only the surface shapes which are different from that in the first embodiment are labeled. Please refer to FIG. 36 for the optical characteristics of each lens elements in the optical imaging lens 8 of the present embodiment.

From the vertical deviation of each curve shown in FIG. 35 part (a), the offset of the off-axis light relative to the image point may be within ±0.009 mm. Referring to FIG. 35 part (b), the focus variation with respect to the three different wavelengths (830 nm, 850 nm and 870 nm) in the whole field falls within ±0.02 mm. Referring to FIG. 35 part (c), the focus variation with respect to the three different wavelengths (830 nm, 850 nm and 870 nm) in the whole field falls within ±0.01 mm. Referring to FIG. 35 part (d), the variation of the distortion aberration of the optical imaging lens 8 may be within ±70%.

Please refer to FIG. 58B for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 811 of the first lens element 810 to the image plane 860 along the optical axis may be about 13.645 mm, EFL may be about 1.852 mm, the image height may be about 2.124 mm, HFOV may be about 73.047 degrees, and Fno may be about 2.743.

In comparison with the first embodiment, the longitudinal spherical aberration and the astigmatism aberration in the tangential direction of the eighth embodiment may be smaller, HFOV of the eighth embodiment may be greater, and Fno of the eighth embodiment may be smaller. Further, the eighth embodiment of the optical imaging lens may be manufactured more easily and the yield rate may be higher.

Figure 38:
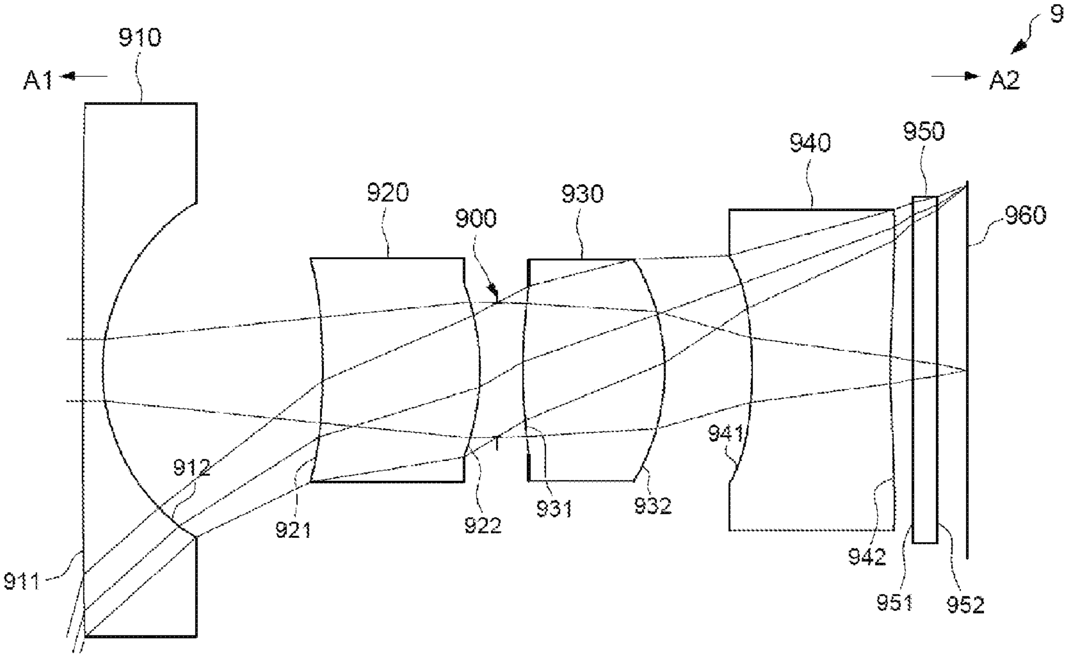
FIG. 38 depicts a cross-sectional view of a ninth embodiment of an optical imaging lens having four lens elements according to the present disclosure.
Figure 39:
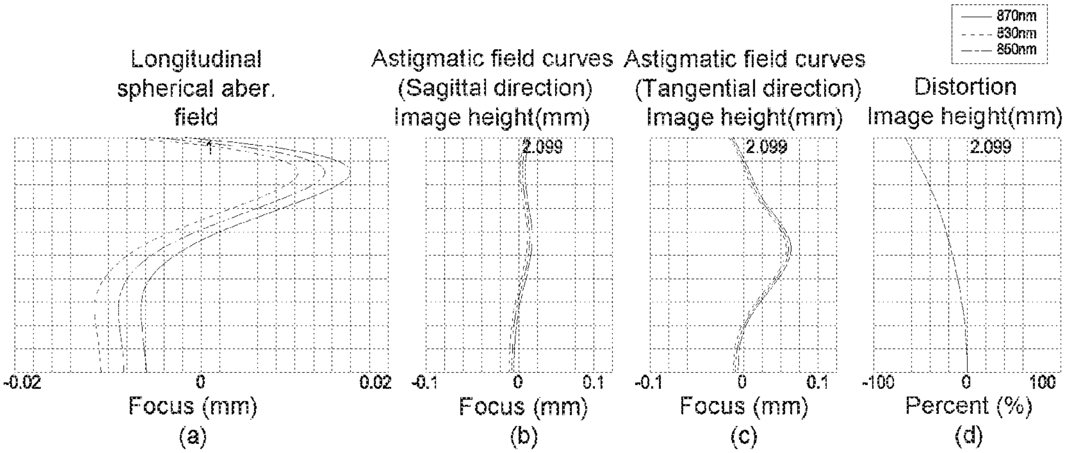
FIG. 39 depicts a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having four lens elements according to a ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise a first lens element 910, a second lens element 920, an aperture stop 900, a third lens element 930 and a fourth lens element 940.

The arrangement of the convex or concave surface structures, including the object-side surfaces 911, 921, 931, and 941 and the image-side surfaces 912, 922, 932, and 942 are generally similar to the optical imaging lens 1. The differences between the optical imaging lens 1 and the optical imaging lens 9 may include a radius of curvature, a thickness, aspherical data, and an effective focal length of each lens element.

Here, for clearly showing the drawings of the present embodiment, only the surface shapes which are different from that in the first embodiment are labeled. Please refer to FIG. 40 for the optical characteristics of each lens elements in the optical imaging lens 9 of the present embodiment.

From the vertical deviation of each curve shown in FIG. 39 part (a), the offset of the off-axis light relative to the image point may be within about ±0.016 mm. Referring to FIG. 39 part (b), the focus variation with respect to the three different wavelengths (830 nm, 850 nm and 870 nm) in the whole field falls within ±0.02 mm. Referring to FIG. 39 part (c), the focus variation with respect to the three different wavelengths (830 nm, 850 nm and 870 nm) in the whole field falls within ±0.06 mm. Referring to FIG. 39 part (d), the variation of the distortion aberration of the optical imaging lens 9 may be within ±70%.

Please refer to FIG. 58B for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 911 of the first lens element 910 to the image plane 960 along the optical axis may be about 10.991 mm, EFL may be about 1.916 mm, the image height may be about 2.099 mm, HFOV may be about 73.037 degrees, and Fno may be about 2.759.

In comparison with the first embodiment, TTL of the ninth embodiment may be smaller. Further, the ninth embodiment of the optical imaging lens may be manufactured more easily and the yield rate may be higher.

Figure 42:
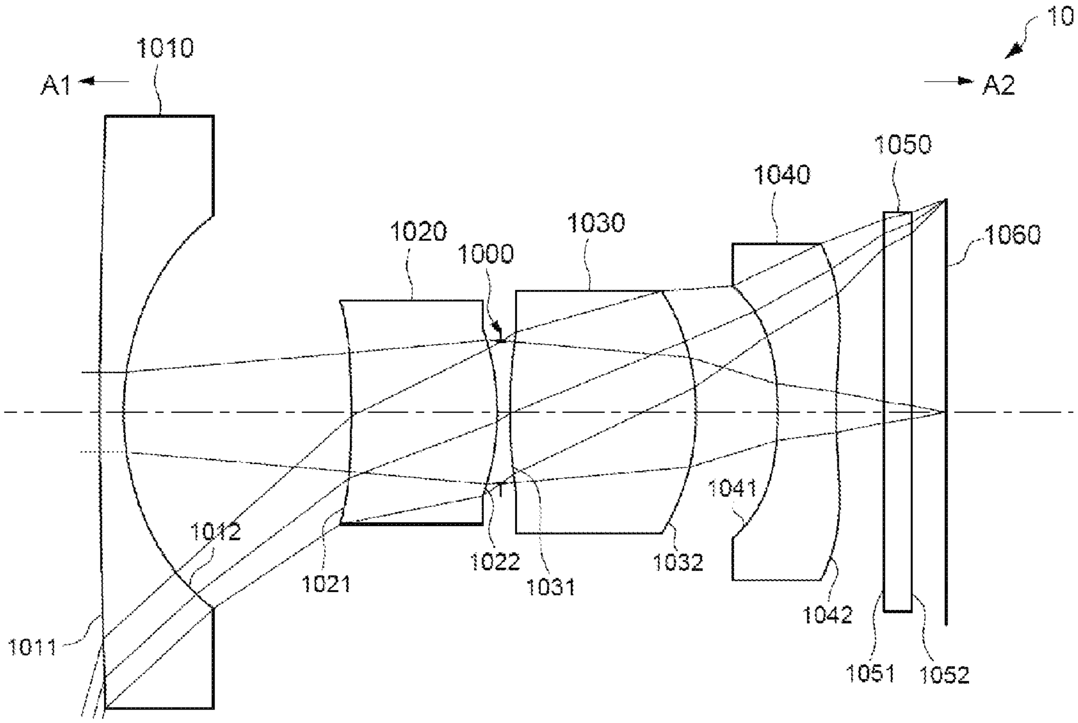
FIG. 42 depicts a cross-sectional view of a tenth embodiment of an optical imaging lens having four lens elements according to the present disclosure.
Figure 43:
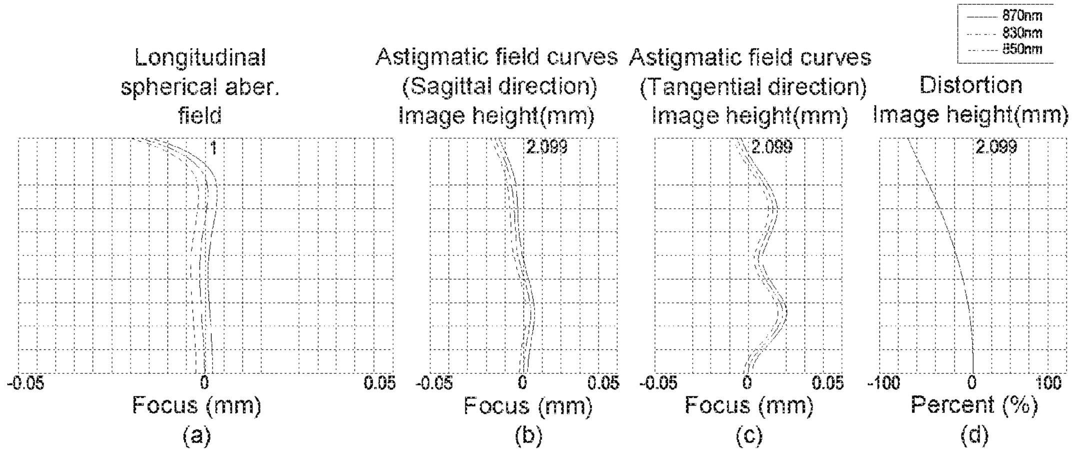
FIG. 43 depicts a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10 having four lens elements according to a tenth example embodiment. FIG. 43 shows example charts of longitudinal spherical aberration and other kinds of optical aberrations of the optical imaging lens 10 according to the tenth embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 42, the optical imaging lens 10 of the present embodiment, in an order from an object side A1 to an image side A2 along an optical axis, may comprise a first lens element 1010, a second lens element 1020, an aperture stop 1000, a third lens element 1030 and a fourth lens element 1040.

The arrangement of the convex or concave surface structures, including the object-side surfaces 1011, 1021, 1031, and 1041 and the image-side surfaces 1012, 1022, 1032, and 1042 are generally similar to the optical imaging lens 1. The differences between the optical imaging lens 1 and the optical imaging lens 10 may include a radius of curvature, a thickness, aspherical data, and an effective focal length of each lens element.

Here, for clearly showing the drawings of the present embodiment, only the surface shapes which are different from that in the first embodiment are labeled. Please refer to FIG. 44 for the optical characteristics of each lens elements in the optical imaging lens 10 of the present embodiment.

From the vertical deviation of each curve shown in FIG. 43 part (a), the offset of the off-axis light relative to the image point may be within ±0.02 mm. Referring to FIG. 43 part (b), the focus variation with respect to the three different wavelengths (830 nm, 850 nm and 870 nm) in the whole field falls within ±0.02 mm. Referring to FIG. 43 part (c), the focus variation with respect to the three different wavelengths (830 nm, 850 nm and 870 nm) in the whole field falls within ±0.02 mm. Referring to FIG. 43 part (d), the variation of the distortion aberration of the optical imaging lens 10 may be within ±70%.

Please refer to FIG. 58B for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 1011 of the first lens element 1010 to the image plane 1060 along the optical axis may be about 9.110 mm, EFL may be about 2.164 mm, the image height may be about 2.099 mm, HFOV may be about 73.050 degrees, and Fno may be about 2.736.

In comparison with the first embodiment, HFOV of the tenth embodiment may be larger, and TTL and Fno of the tenth embodiment may be smaller. Further, the tenth embodiment of the optical imaging lens may be manufactured more easily and the yield rate may be higher.

Figure 46:
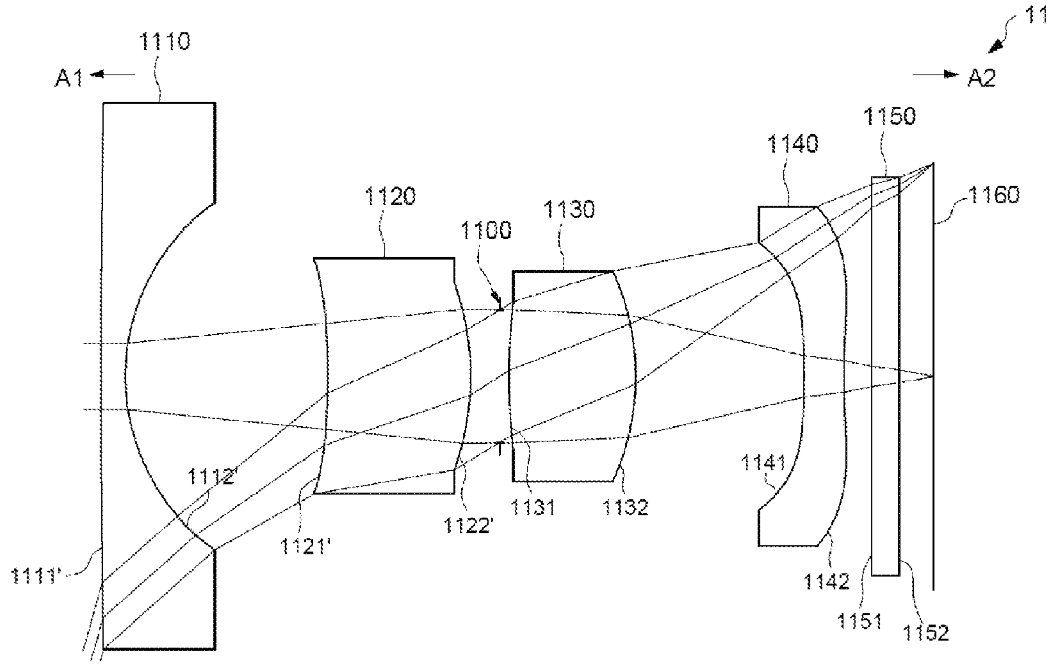
FIG. 46 depicts a cross-sectional view of an eleventh embodiment of an optical imaging lens having four lens elements according to the present disclosure.
Figure 47:
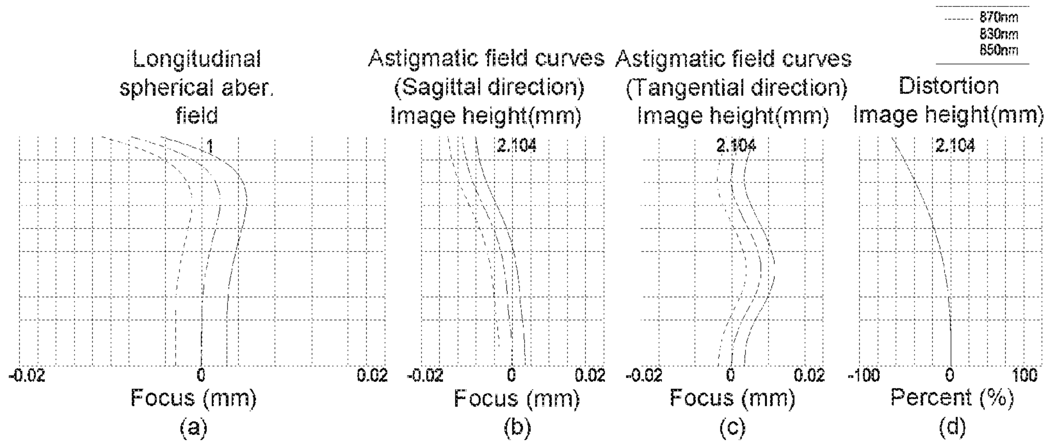
FIG. 47 depicts a chart of longitudinal spherical aberration and other kinds of optical aberrations of an eleventh embodiment of the optical imaging lens according to the present disclosure.

Reference is now made to FIGS. 46-49. FIG. 46 illustrates an example cross-sectional view of an optical imaging lens 11 having four lens elements of the optical imaging lens according to a eleventh example embodiment. FIG. 47 shows example charts of longitudinal spherical aberration and other kinds of optical aberrations of the optical imaging lens 11 according to the eleventh example embodiment. FIG. 48 shows an example table of optical data of each lens element of the optical imaging lens 11 according to the eleventh example embodiment. FIG. 49 shows an example table of aspherical data of the optical imaging lens 11 according to the eleventh example embodiment. The reference numbers labeled in the present embodiment are similar to those in the first embodiment for the similar elements, but here the reference numbers are initialed with 11, for example, reference number 1131 for labelling the object-side surface of the third lens element 1130, reference number 1132 for labelling the image-side surface of the third lens element 1130, etc.

As shown in FIG. 46, the optical imaging lens 11 of the present embodiment, in an order from an object side A1 to an image side A2 along an optical axis, may comprise a first lens element 1110, a second lens element 1120, an aperture stop 1100, a third lens element 1130 and a fourth lens element 1140.

The arrangement of the convex or concave surface structures, including the object-side surfaces 1111', 1121', 1131, and 1141 and the image-side surfaces 1112', 1122', 1132, and 1142 are generally the same with the optical imaging lens 1. The differences between the optical imaging lens 1 and the optical imaging lens 11 may include a radius of curvature, a thickness, aspherical data, and an effective focal length of each lens element.

Here, for clearly showing the drawings of the present embodiment, only the surface shapes which are different from that in the first embodiment are labeled. Please refer to FIG. 48 for the optical characteristics of each lens elements in the optical imaging lens 11 of the present embodiment.

From the vertical deviation of each curve shown in FIG. 47 part (a), the offset of the off-axis light relative to the image point may be within about ±0.012 mm. Referring to FIG. 47 part (b), the focus variation with respect to the three different wavelengths (830 nm, 850 nm and 870 nm) in the whole field may fall within about ±0.016 mm. Referring to FIG. 47 part (c), the focus variation with respect to the three different wavelengths (830 nm, 850 nm and 870 nm) in the whole field may fall within about ±0.01 mm. Refer to FIG. 47 part (d), the variation of the distortion aberration of the optical imaging lens 11 may be within about ±70%.

Please refer to FIG. 58B for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 1111' of the first lens element 1110 to the image plane 1160 along the optical axis may be about 8.967 mm, EFL may be about 1.864 mm, the image height may be about 2.104 mm, HFOV may be about 72.998 degrees, and Fno may be about 2.757

Comparing with the first embodiment, the longitudinal spherical aberration, the astigmatism aberration in the tangential direction and TTL of the eleventh embodiment may be smaller. Further, the eleventh embodiment may be manufactured more easily and the yield rate may be higher.

Figure 50:
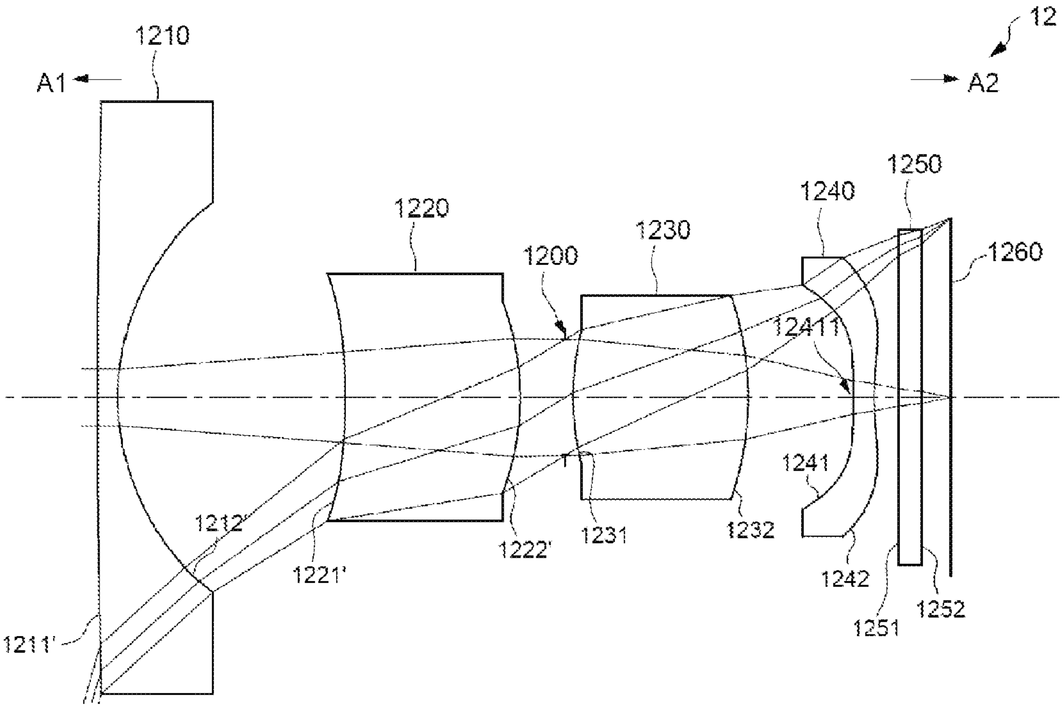
FIG. 50 depicts a cross-sectional view of a twelfth embodiment of an optical imaging lens having four lens elements according to the present disclosure.
Figure 51:
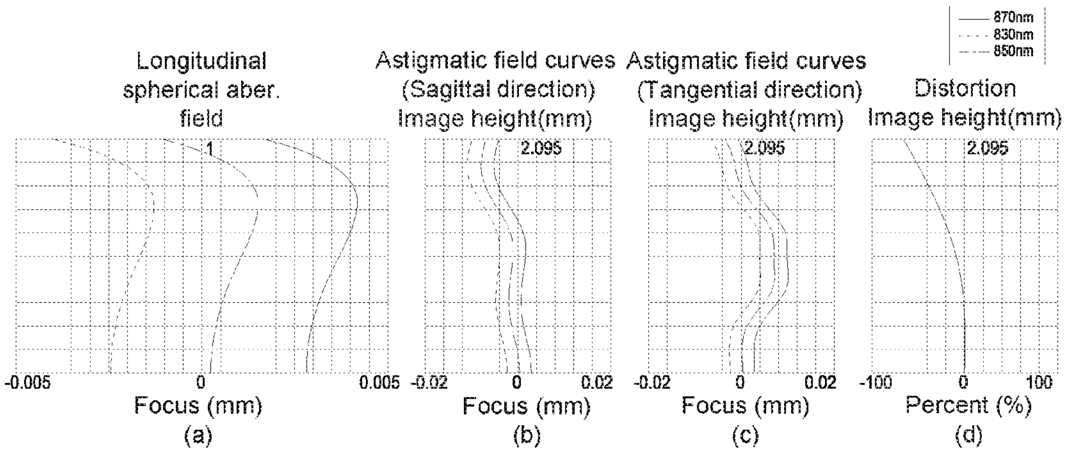
FIG. 51 depicts a chart of longitudinal spherical aberration and other kinds of optical aberrations of a twelfth embodiment of the optical imaging lens according to the present disclosure.

Reference is now made to FIGS. 50-53. FIG. 50 illustrates an example cross-sectional view of an optical imaging lens 12 having four lens elements of the optical imaging lens according to a twelfth example embodiment. FIG. 51 shows example charts of longitudinal spherical aberration and other kinds of optical aberrations of the optical imaging lens 12 according to the twelfth example embodiment. FIG. 52 shows an example table of optical data of each lens element of the optical imaging lens 12 according to the twelfth example embodiment. FIG. 53 shows an example table of aspherical data of the optical imaging lens 12 according to the twelfth example embodiment. The reference numbers labeled in the present embodiment are similar to those in the first embodiment for the similar elements, but here the reference numbers are initialed with 12, for example, reference number 1231 for labelling the object-side surface of the third lens element 1230, reference number 1232 for labelling the image-side surface of the third lens element 1230, etc.

As shown in FIG. 50, the optical imaging lens 12 of the present embodiment, in an order from an object side A1 to an image side A2 along an optical axis, may comprise a first lens element 1210, a second lens element 1220, an aperture stop 1200, a third lens element 1230 and a fourth lens element 1240.

The arrangement of the convex or concave surface structures, including the object-side surfaces 1211', 1221', and 1231 and the image-side surfaces 1212', 1222', 1232, and 1242 are generally same with the optical imaging lens 1. The differences between the optical imaging lens 1 and the optical imaging lens 12 may include the concave/convex shapes of the object-side surface 1241, a radius of curvature, a thickness, aspherical data, and an effective focal length of each lens element. More specifically, the object-side surface 1241 may comprise a convex portion 12411 in a vicinity of the optical axis.

Here, for clearly showing the drawings of the present embodiment, only the surface shapes which are different from that in the first embodiment are labeled. Please refer to FIG. 52 for the optical characteristics of each lens elements in the optical imaging lens 12 of the present embodiment.

From the vertical deviation of each curve shown in FIG. 51 part (a), the offset of the off-axis light relative to the image point may be within about ±0.005 mm. Referring to FIG. 51 part (b), the focus variation with respect to the three different wavelengths (830 nm, 850 nm and 870 nm) in the whole field may fall within about ±0.012 mm. Referring to FIG. 51 part (c), the focus variation with respect to the three different wavelengths (830 nm, 850 nm and 870 nm) in the whole field may fall within about ±0.01 mm. Referring to FIG. 51 part (d), the variation of the distortion aberration of the optical imaging lens 12 may be within about ±70%.

Please refer to FIG. 58B for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 1211' of the first lens element 1210 to the image plane 1260 along the optical axis may be about 10.885 mm, EFL may be about 1.873 mm, the image height may be about 2.095 mm, HFOV may be about 73.016 degrees, and Fno may be about 2.785.

In comparison with the first embodiment, TTL, the longitudinal spherical aberration, and the astigmatism aberration in the sagittal and tangential directions in the twelfth embodiment may be smaller. Further, the twelfth embodiment may be manufactured more easily and the yield rate may be higher.

Figure 54:
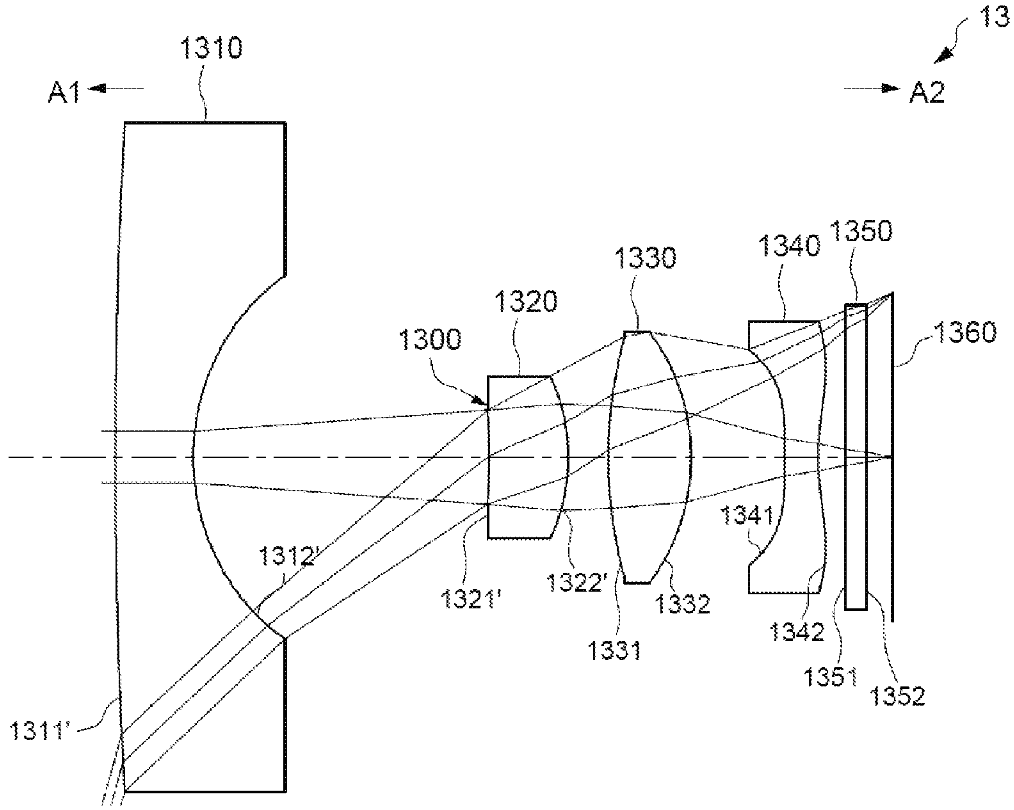
FIG. 54 depicts a cross-sectional view of a thirteenth embodiment of an optical imaging lens having four lens elements according to the present disclosure.
Figure 55:
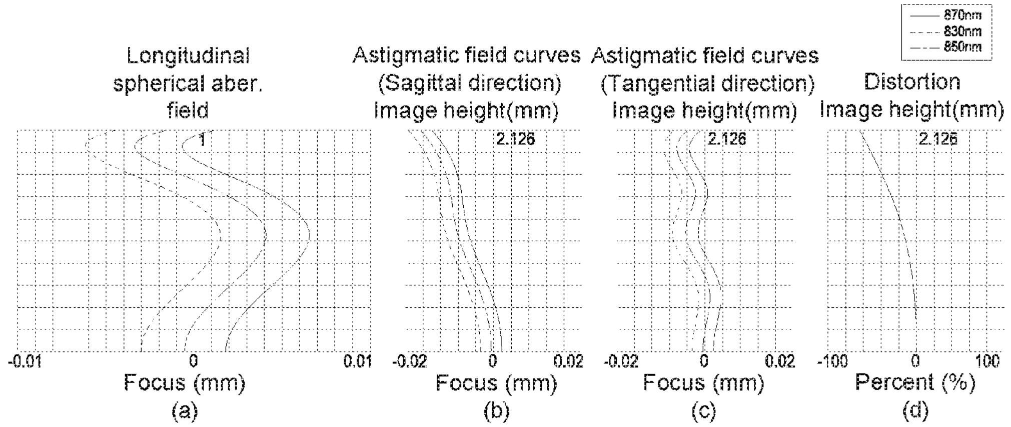
FIG. 55 depicts a chart of longitudinal spherical aberration and other kinds of optical aberrations of a thirteenth embodiment of the optical imaging lens according to the present disclosure.

Reference is now made to FIGS. 54-57. FIG. 54 illustrates an example cross-sectional view of an optical imaging lens 13 having four lens elements of the optical imaging lens according to a thirteenth example embodiment. FIG. 55 shows example charts of longitudinal spherical aberration and other kinds of optical aberrations of the optical imaging lens 13 according to the thirteenth example embodiment. FIG. 56 shows an example table of optical data of each lens element of the optical imaging lens 13 according to the thirteenth example embodiment. FIG. 57 shows an example table of aspherical data of the optical imaging lens 13 according to the thirteenth example embodiment. The reference numbers labeled in the present embodiment are similar to those in the first embodiment for the similar elements, but here the reference numbers are initialed with 13, for example, reference number 1331 for labelling the object-side surface of the third lens element 1330, reference number 1332 for labelling the image-side surface of the third lens element 1330, etc.

As shown in FIG. 54, the optical imaging lens 13 of the present embodiment, in an order from an object side A1 to an image side A2 along an optical axis, may comprise a first lens element 1310, an aperture stop 1300, a second lens element 1320, a third lens element 1330 and a fourth lens element 1340.

The arrangement of the convex or concave surface structures, including the object-side surfaces 1311', 1321', 1331, and 1341 and the image-side surfaces 1312', 1322', 1332, and 1342 are generally same with the optical imaging lens 1. The differences between the optical imaging lens 1 and the optical imaging lens 13 may include the position of the aperture stop, a radius of curvature, a thickness, aspherical data, and an effective focal length of each lens element. More specifically, the aperture stop 1300 is positioned between the first lens element 1310 and the second lens element 1320.

Here, for clearly showing the drawings of the present embodiment, only the surface shapes which are different from that in the first embodiment are labeled. Please refer to FIG. 56 for the optical characteristics of each lens elements in the optical imaging lens 13 of the present embodiment.

From the vertical deviation of each curve shown in FIG. 55 part (a), the offset of the off-axis light relative to the image point may be within about ±0.007 mm. Referring to FIG. 55 part (b), the focus variation with respect to the three different wavelengths (830 nm, 850 nm and 870 nm) in the whole field may fall within about ±0.02 mm. Referring to FIG. 55 part (c), the focus variation with respect to the three different wavelengths (830 nm, 850 nm and 870 nm) in the whole field may fall within about ±0.01 mm. Referring to FIG. 55 part (d), the variation of the distortion aberration of the optical imaging lens 13 may be within about ±70%.

Please refer to FIG. 58B for the values of T1, G12, T2, G23, T3, G34, T4, EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the present embodiment.

The distance from the object-side surface 1311' of the first lens element 1310 to the image plane 1360 along the optical axis may be about 10.969 mm, EFL may be about 1.842 mm, the image height may be about 2.126 mm, HFOV may be about 73.055 degrees, and Fno may be about 2.716.

In comparison with the first embodiment, TTL, Fno, the longitudinal spherical aberration, and the astigmatism aberration in the tangential direction in the thirteenth embodiment may be smaller, and HFOV in the thirteenth embodiment may be larger. Further, the thirteenth embodiment may be manufactured more easily and the yield rate may be higher.

Please refer to FIGS. 58A and 58B show the values of EFL, TL, BFL, ALT, Gaa, TTL, TTL/(T2+G34), G12/T2, TTL/G12, ALT/(G12+G34), TTL/(G12+G34), ALT/G12, (T2+T3)/G34, (G12+T3)/T2, Gaa/T2, TL/(G12+G34), (G12+G34)/T2, T3/G34, (T2+G23)/G34, ALT/G34, TTL/G34, TL/G34, (T2+T1)/G34, (T4+T2)/G34, EFL/G34 and (T4+T3)/G34 of the first to thirteenth embodiments, and it is clear that the optical imaging lenses of the first to thirteenth embodiments may satisfy the Equations (1)-(20).

According to above disclosure, the longitudinal spherical aberration, the astigmatism aberration and the variation of the distortion aberration of each embodiment meet the use requirements of various electronic products which implement an optical imaging lens. Moreover, the off-axis light with respect to 830 nm, 850 nm and 870 nm wavelengths may be focused around an image point, and the offset of the off-axis light for each curve relative to the image point may be controlled to effectively inhibit the longitudinal spherical aberration, the astigmatism aberration and the variation of the distortion aberration. Further, as shown by the imaging quality data provided for each embodiment, the distance between the 830 nm, 850 nm and 870 nm wavelengths may indicate that focusing ability and inhibiting ability for dispersion is provided for different wavelengths.

The material of the third lens element in each embodiment using glass may have improved thermal stability. The embodiments in present disclosure may have focusing ability and inhibiting ability for dispersion for infrared wavelengths, such that the present disclosure may be applied for a night version lens, a pupil recognition lens or a VR tracker for infrared imaging and provide improved imaging quality.

According to above illustration, the optical imaging lens of the present disclosure may provide an effectively shortened optical imaging lens length while maintaining good optical characteristics, by controlling the structure of the lens elements as well as at least one of the inequalities described herein.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention (s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third and fourth lens elements, each of said first, second, third and fourth lens elements having refracting power, an object-side surface facing toward said object side and an image-side surface facing toward said image side, wherein:

said object-side surface of said first lens element comprises a convex portion in a vicinity of the optical axis, and said image-side surface of said first lens element comprises a concave portion in a vicinity of a periphery of said first lens element;

said second lens element has positive refracting power, and said image-side surface of said second lens element comprises a convex portion in a vicinity of the optical axis;

said object-side surface of said third lens element comprises a convex portion in a vicinity of the optical axis;

said object-side surface of said fourth lens element comprises a concave portion in a vicinity of a periphery of said fourth lens element, and said image-side surface of said fourth lens element comprises a convex portion in a vicinity of a periphery of said fourth lens element;

said optical imaging lens comprises no other lenses having refracting power beyond said first, second, third and fourth lens elements;

a distance between said object-side surface of said first lens element and an image plane along the optical axis is represented by TTL, a central thickness of said second lens element along the optical axis is represented by T2, an air gap between said third lens element and said fourth lens element along the optical axis is represented by G34, and TTL, T2 and G34 satisfy the equation: $TTL/(T2+G34) \leq 4.5$, and TTL and G34 satisfy the equation: $TTL/G34 \leq 13.7$.

2. The optical imaging lens according to claim 1, wherein an air gap between said first lens element and said second lens element along the optical axis is represented by G12, and G12 and T2 satisfy the equation: $G12/T2 \geq 1.3$.

3. The optical imaging lens according to claim 1, wherein an air gap between said first lens element and said second lens element along the optical axis is represented by G12, and TTL and G12 satisfy the equation: $TTL/G12 \leq 5.4$.

4. The optical imaging lens according to claim 1, wherein a sum of the central thicknesses of all lens elements is represented by ALT, an air gap between said first lens element and said second lens element along the optical axis is represented by G12, and ALT, G12, and G34 satisfy the equation: $ALT/(G12+G34) \leq 2$.

5. The optical imaging lens according to claim 1, wherein an air gap between said first lens element and said second lens element along the optical axis is represented by G12, and wherein TTL, G12 and G34 satisfy the equation: $TTL/(G12+G34) \leq 4$.

6. The optical imaging lens according to claim 1, wherein a sum of the central thicknesses of all lens elements is represented by ALT, an air gap between said first lens element and said second lens element along the optical axis is represented by G12, and ALT and G12 satisfy the equation: $ALT/G12 \leq 2.6$.

7. The optical imaging lens according to claim 1, wherein a central thickness of said third lens element along the optical axis is represented by T3, and T2, T3 and G34 satisfy the equation: $(T2+T3)/G34 \leq 5$.

8. The optical imaging lens according to claim 1, wherein an air gap between said first lens element and said second lens element along the optical axis is represented by G12, a central thickness of said third lens element along the optical axis is represented by T3, and G12, T3 and T2 satisfy the equation: $(G12+T3)/T2 \geq 2.3$.

9. The optical imaging lens according to claim 1, wherein a sum of all air gaps between all lens elements along the optical axis is represented by Gaa, and Gaa and T2 satisfy the equation: $Gaa/T2 \geq 2.2$.

10. The optical imaging lens according to claim 1, wherein a distance from said object-side surface of said first lens element to said image-side surface of said fourth lens element along the optical axis is represented by TL, an air gap between said first lens element and said second lens element along the optical axis is represented by G12, and TL, G12 and G34 satisfy the equation: $TL/(G12+G34) \leq 3.2$.

11. The optical imaging lens according to claim 1, wherein an air gap between said first lens element and said second lens element along the optical axis is represented by G12, and G12, G34 and T2 satisfy the equation: $(G12+G34)/T2 \geq 1.9$.

12. The optical imaging lens according to claim 1, wherein a central thickness of said third lens element along the optical axis is represented by T3, and T3 and G34 satisfy the equation: $T3/G34 \leq 2.5$.

13. The optical imaging lens according to claim 1, wherein an air gap between said second lens element and said third lens element along the optical axis is represented by G23, and G23, T2 and G34 satisfy the equation: $(T2+G23)/G34 \leq 3.5$.

14. The optical imaging lens according to claim 1, wherein a sum of the central thicknesses of all lens elements is represented by ALT, and ALT and G34 satisfy the equation: $ALT/G34 \leq 6.9$.

15. The optical imaging lens according to claim 1, wherein a distance from said object-side surface of said first lens element to said image-side surface of said fourth lens element along the optical axis is represented by TL, and TL and G34 satisfy the equation: $TL/G34 \leq 11$.

16. The optical imaging lens according to claim 1, wherein a central thickness of said first lens element along the optical axis is represented by T1, and T2, T1 and G34 satisfy the equation: $(T2+T1)/G34 \leq 3.5$.

17. The optical imaging lens according to claim 1, a central thickness of said fourth lens element along the optical axis is represented by T4, and T4, T2 and G34 satisfy the equation: $(T4+T2)/G34 \leq 3.5$.

18. The optical imaging lens according to claim 1, wherein an effective focal length of said optical imaging lens is represented by EFL, and EFL and G34 satisfy the equation: $EFL/G34 \leq 2.6$.

19. The optical imaging lens according to claim 1, wherein a central thickness of said fourth lens element along the optical axis is represented by T4, a central thickness of said third lens element along the optical axis is represented by T3, and T4, T3 and G34 satisfy the equation: $(T4+T3)/G34 \leq 3.2$.

* * * * *